(12) United States Patent
Sinha et al.

(10) Patent No.: US 11,019,454 B2
(45) Date of Patent: May 25, 2021

(54) APPARATUS AND METHODS FOR DEVICE LOCATION DETERMINATION

(71) Applicant: Charter Communications Operating, LLC, St. Louis, MO (US)

(72) Inventors: Ashutosh Kumar Sinha, Centennial, CO (US); Benjamin Stankevitz, Lakewood, CO (US); Manoj Das, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/678,900

(22) Filed: Nov. 8, 2019

(65) Prior Publication Data

US 2020/0145784 A1   May 7, 2020

Related U.S. Application Data

(63) Continuation of application No. 15/895,875, filed on Feb. 13, 2018, now Pat. No. 10,477,349.

(51) Int. Cl.
*H04W 8/04* (2009.01)
*H04W 4/02* (2018.01)
*H04W 8/18* (2009.01)

(52) U.S. Cl.
CPC ............ *H04W 4/023* (2013.01); *H04W 8/04* (2013.01); *H04W 8/18* (2013.01)

(58) Field of Classification Search
CPC ............ H04W 4/02; H04W 8/04; H04W 8/18
See application file for complete search history.

(56) References Cited

U.S. PATENT DOCUMENTS

| | | | |
|---|---|---|---|
| 5,948,040 | A | 9/1999 | Delorme et al. |
| 6,240,555 | B1 | 5/2001 | Shoff et al. |
| 6,249,680 | B1 | 6/2001 | Wax et al. |
| 6,359,711 | B1 | 3/2002 | Cole et al. |

(Continued)

OTHER PUBLICATIONS

3GPP TS 23.228 V2.0.0, Mar. 2001, 3rd Generation Partnership Project; Technical Specification Group Services and System Aspects; IP Multimedia (IM) Subsystem—Stage 2; 127 pages.

(Continued)

*Primary Examiner* — Myron Wyche
(74) *Attorney, Agent, or Firm* — Gazdzinski & Associates, PC

(57) ABSTRACT

Apparatus and methods for provision of location-based services to wireless device users. In one embodiment, the apparatus and methods support location-based services requiring indoors or underground positioning (or other applications which cannot be served by GPS/A-GPS or GLONASS), such as via Wi-Fi Location devices with fine timing measurement (FTM) capability. A cable, terrestrial or satellite network operator can obtain location data on e.g., an LTE-enabled UE with SIM capability located within a served premises or venue, via an HTTP/S GET protocol, and forward the location data. In one variant, a managed 3GPP IP Multimedia System (IMS) infrastructure is used in conjunction with UE-specific identifiers under control of a controller entity (e.g., ePDG) in communication with the IMS infrastructure and one or more FTM-enabled Wi-Fi APs within the premises or venue for supporting VoWi-Fi 911 or 411 packet calls made via the IMS.

20 Claims, 13 Drawing Sheets

(56) References Cited

U.S. PATENT DOCUMENTS

| | | |
|---|---|---|
| 6,523,696 B1 | 2/2003 | Saito et al. |
| 7,039,048 B1 | 5/2006 | Monta et al. |
| 7,359,375 B2 | 4/2008 | Lipsanen et al. |
| 7,742,074 B2 | 6/2010 | Minatogawa |
| 7,809,942 B2 | 10/2010 | Baran et al. |
| 7,954,131 B2 | 5/2011 | Cholas et al. |
| 8,073,903 B2 | 12/2011 | Wood et al. |
| 8,380,226 B2 | 2/2013 | Clipsham |
| 8,438,221 B2 | 5/2013 | Wood et al. |
| 8,997,136 B2 | 3/2015 | Brooks et al. |
| 9,632,828 B1 * | 4/2017 | Mehta ............... H04L 12/00 |
| 10,477,349 B2 * | 11/2019 | Sinha ............... H04W 8/04 |
| 2002/0024943 A1 | 2/2002 | Karaul et al. |
| 2002/0027883 A1 | 3/2002 | Belaiche |
| 2002/0095689 A1 | 7/2002 | Novak |
| 2002/0107032 A1 | 8/2002 | Agness et al. |
| 2003/0012190 A1 | 1/2003 | Kaku et al. |
| 2003/0114162 A1 | 6/2003 | Chheda et al. |
| 2003/0166401 A1 | 9/2003 | Combes et al. |
| 2003/0200548 A1 | 10/2003 | Baran et al. |
| 2004/0117843 A1 | 6/2004 | Karaoguz et al. |
| 2004/0137918 A1 | 7/2004 | Varonen et al. |
| 2004/0166881 A1 | 8/2004 | Farchmin |
| 2004/0257440 A1 | 12/2004 | Kondo et al. |
| 2005/0007278 A1 | 1/2005 | Anson et al. |
| 2005/0083921 A1 | 4/2005 | McDermott, III et al. |
| 2005/0108763 A1 | 5/2005 | Baran et al. |
| 2006/0088030 A1 | 4/2006 | Beeson et al. |
| 2006/0130101 A1 | 6/2006 | Wessel |
| 2006/0165197 A1 | 7/2006 | Morita et al. |
| 2006/0187900 A1 | 8/2006 | Akbar |
| 2006/0209799 A1 | 9/2006 | Gallagher et al. |
| 2006/0291506 A1 | 12/2006 | Cain |
| 2007/0025271 A1 | 2/2007 | Niedrich et al. |
| 2007/0076696 A1 | 4/2007 | An et al. |
| 2007/0081537 A1 | 4/2007 | Wheelock |
| 2007/0150920 A1 | 6/2007 | Lee et al. |
| 2007/0153775 A1 | 7/2007 | Renschler |
| 2007/0162945 A1 | 7/2007 | Mills |
| 2007/0209059 A1 | 9/2007 | Moore et al. |
| 2007/0226762 A1 | 9/2007 | Girgis et al. |
| 2008/0092163 A1 | 4/2008 | Song et al. |
| 2008/0104634 A1 | 5/2008 | Gajdos et al. |
| 2008/0170530 A1 | 7/2008 | Connors et al. |
| 2008/0182591 A1 | 7/2008 | Krikorian |
| 2008/0216113 A1 | 9/2008 | Yun et al. |
| 2009/0010271 A1 | 1/2009 | Bachmann et al. |
| 2009/0013356 A1 | 1/2009 | Doerr et al. |
| 2009/0083813 A1 | 3/2009 | Dolce et al. |
| 2009/0111456 A1 | 4/2009 | Shaffer et al. |
| 2009/0144438 A1 | 6/2009 | Montpetit |
| 2009/0175218 A1 | 7/2009 | Song et al. |
| 2009/0291631 A1 | 11/2009 | Xue et al. |
| 2009/0296621 A1 | 12/2009 | Park et al. |
| 2010/0027769 A1 | 2/2010 | Stevens et al. |
| 2010/0030578 A1 | 2/2010 | Siddique et al. |
| 2010/0135205 A1 | 6/2010 | Li et al. |
| 2010/0151816 A1 | 6/2010 | Besehanic et al. |
| 2010/0159951 A1 | 6/2010 | Shkedi |
| 2010/0202368 A1 | 8/2010 | Hans |
| 2010/0217613 A1 | 8/2010 | Kelly |
| 2010/0287609 A1 | 11/2010 | Gonzalez et al. |
| 2010/0309051 A1 | 12/2010 | Moshfeghi |
| 2011/0009122 A1 | 1/2011 | Kalavade |
| 2011/0112717 A1 | 5/2011 | Resner |
| 2011/0286437 A1 | 11/2011 | Austin et al. |
| 2012/0046049 A1 | 2/2012 | Curtis et al. |
| 2012/0115501 A1 | 5/2012 | Zheng |
| 2012/0172062 A1 | 7/2012 | Altman et al. |
| 2012/0202447 A1 | 8/2012 | Edge et al. |
| 2012/0203853 A1 | 8/2012 | Davis et al. |
| 2012/0302259 A1 | 11/2012 | Busch |
| 2013/0023247 A1 | 1/2013 | Bolon et al. |
| 2013/0045681 A1 | 2/2013 | Dua |
| 2013/0046623 A1 | 2/2013 | Moritz et al. |
| 2013/0095848 A1 | 4/2013 | Gold et al. |
| 2014/0046624 A1 | 2/2014 | Miettinen |
| 2014/0331329 A1 * | 11/2014 | Edge ............... G01S 5/0205 |
| | | 726/26 |
| 2015/0365805 A1 | 12/2015 | Bajko et al. |
| 2016/0006133 A1 | 1/2016 | Ganchrow et al. |
| 2016/0066133 A1 * | 3/2016 | Li ............... H04W 48/16 |
| | | 455/456.3 |
| 2016/0105780 A1 * | 4/2016 | Hooker ............... H04L 65/1006 |
| | | 370/338 |
| 2016/0189193 A1 | 6/2016 | Toumayan et al. |
| 2017/0126614 A1 | 5/2017 | Sinha et al. |
| 2017/0164144 A1 | 6/2017 | Panchabhai et al. |
| 2019/0052603 A1 | 2/2019 | Wu |

OTHER PUBLICATIONS

3GPP TS 24.229 V5.25.0, Sep. 2011, 3rd Generation Partnership Project; Technical Specification Group Core Network and Terminals; IP multimedia call control protocol based on Session Initiation Protocol (SIP) and Session Description Protocol (SDP); Stage 3—(Release 5), 260 pages.
3GPP TS 24.237 IP Multimedia (IM) Core Network (CN) subsystem IP Multimedia Subsystem (IMS) service continuity; Stage 3.
3GPP TS 24.244 V12.2.0, Mar. 2015, 3rd Generation Partnership Project; Technical Specification Group Core Network and Terminals; Wireless LAN control plane protocol for trusted WLAN access to EPC; Stage 3 (Release 12), 36 pages.
3GPP TS 24.302 V12.8.0, Mar. 2015, 3rd Generation Partnership Project; Technical Specification Group Core Network and Terminals; Access to the 3GPP Evolved Packet Core (EPC) via non-3GPP access networks; Stage 3 (Release 12), 104 pages.
Data-Over-Cable Service Interface Specifications DOCSIS 3.1—MAC and Upper Layer Protocols Interface Specification, May 10, 2017, 838 pages.
Deering et al., Internet Protocol, Version 6 (IPv6) Specification, Dec. 1998, 39 pages.
ETSI TS 123 003 V10.5.0, Apr. 2012, Digital Cellular Telecommunications System (Phase 2+); Universal Mobile Telecommunications System (UMTS); Numbering, Addressing and Identification, 83 pages.
ETSI TS 123 402 V10.4.0, Jun. 2011, Universal Mobile Telecommunications System (UMTS); LTE; Architecture enhancements for non-3GPP accesses, 233 pages.
ETSI TS 133 402 V11.4.0, Nov. 2012, Digital Cellular Telecommunications System (Phase 2+); Universal Mobile Telecommunications System (UMTS); LTE, 53 pages.
Extensible Authentication Protocol Method for 3rd Generation Authentication and Key Agreement (EAP-AKA), Jan. 2006, J. Arkko-Ericsson and H. Haverinen-Nokia, 79 pages.
GSMA IR.51 describes the IP Multimedia Subsystem (IMS) Profile for Voice and Video.
GSMA IR.88 LTE and EPC Roaming Guidelines, Version 16.0, Jul. 5, 2017, 90 pages.
GSMA PRD IR.61 WLAN Roaming Guidelines (also known as Inter-Operator Handbook) Version 3.0.0, Apr. 2003, 20 pages.
GSMA PRD IR.92 IMS Profile for Voice and SMS, Version 9.0, Apr. 8, 2015, 40 pages.
GSMA PRD IR.94 IMS Profile for Conversational Video Service, Version 11.0, May 24, 2016, 22 pages.
GSMA TS.22 Recommendations for Minimum Wi-Fi Capabilities of Terminals, Version 5.0, Apr. 7, 2016, 38 pages.
IEEE Standard for Information technology—Telecommunications and information exchange between systems Local and metropolitan area networks—Specific requirements—Part 11: Wireless LAN Medium Access Control (MAC) and Physical Layer (PHY) Specifications 802.11-2016 Abstract.
Improved Extensible Authentication Protocol Method for 3rd Generation Authentication and Key Agreement (EAP-AKA), May 2009, J. Arkko and V. Lehtovirta-Ericsson and P. Eronen-Nokia, 29 pages.
Internet Engineering Task Force (IETF), RFC 5996, Internet Key Exchange Protocol Version 2 (IKEv2), Sep. 2010, 138 pages.

(56) References Cited

OTHER PUBLICATIONS

Internet Protocol DARPA Internet Program Protocol Specification, Sep. 1981, 51 pages.
Private Header (P-Header) Extensions to the Session Initiation Protocol (SIP) for the 3rd-Generation Partnership Project (3GPP), The Internet Society (2003), 34 pages.

* cited by examiner

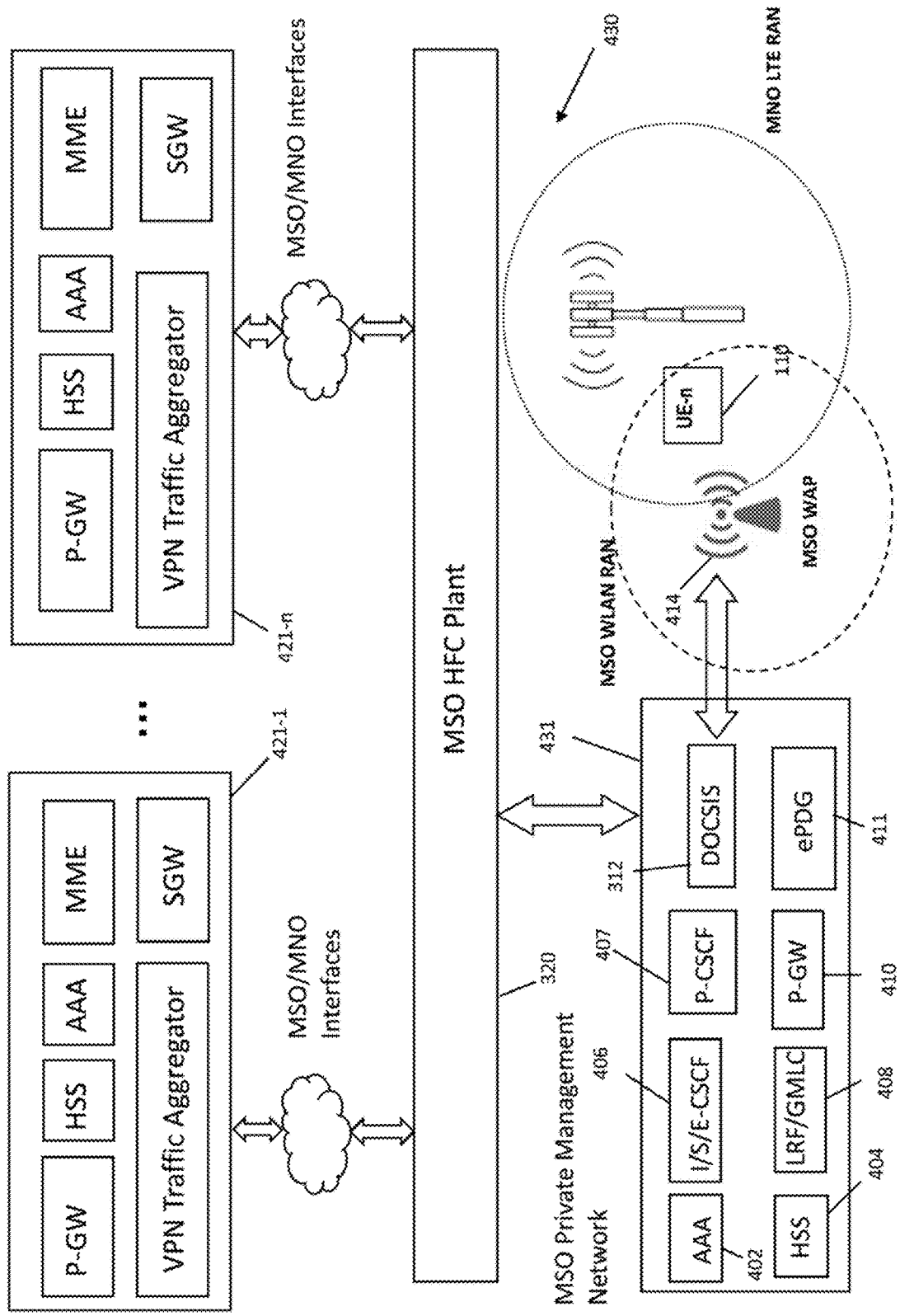

APPARATUS AND METHODS FOR DEVICE LOCATION DETERMINATION

PRIORITY

This application is a continuation of and claims priority to co-owned and co-pending U.S. patent application Ser. No. 15/895,875 of the same title filed Feb. 13, 2018, and issuing as U.S. Pat. No. 10,477,349 on Nov. 12, 2019, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless devices and networks thereof, and specifically in one exemplary aspect to obtaining and use of location information for, inter alia, provision of location-based services such as emergency calling or delivery.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE). |
|  | 1900 MHz PCS, Band 2 (GSM/GPRS/EDGE). |
|  | 850 MHz Cellular, Band 5 (UMTS/HSPA+ up to 21 Mbit/s). |
|  | 1900 MHz PCS, Band 2 (UMTS/HSPA+ up to 21 Mbit/s). |
| 4G | 700 MHz Lower B/C, Band 12/17 (LTE). |
|  | 850 MHz Cellular, Band 5 (LTE). |
|  | 1700/2100 MHz AWS, Band 4 (LTE). |
|  | 1900 MHz PCS, Band 2 (LTE). |
|  | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |

TABLE 2-continued

| Frequency range | Type | Center frequency | Availability | Licensed users |
|---|---|---|---|---|
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs (e.g., Wi-Fi) and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a "hotspot," a physical location at which the user may obtain access by connecting to modems, routers, APs, etc. that are within wireless range.

802.11-2016

IEEE 802.11-2016 is a revision based on IEEE 802.11-2012, and incorporates multiple amendments (including 802.11ae, 0.11aa, 0.11ad, 0.11ac, and 0.11af). Extant MAC and PHY functions have been enhanced, advanced capabilities that provide location determination indoors. So-called "Wi-Fi Location™" is intended to provide enhanced user experience indoors, complementing to current outdoor location-based services (LB S) such as GPS/A-GPS which cannot operate in many indoor or underground applications. Ostensibly, such indoor location-based services enable the creation of new applications and services that can be used consistent with various types of industries. Wi-Fi Location is based on the Fine Timing Measurement (FTM) protocol of IEEE 802.11-2016, and is intended to deliver meter-level accuracy for indoor device location functions such as indoor navigation, emergency services, and the like. Give the relative ubiquity of (i) Wi-Fi networks, and (ii) Wi-Fi capability on mobile platforms such as smartphones, Wi-Fi Location is intended to enable position data delivery without separate or proprietary network infrastructure, thereby greatly reducing implementation barriers for carriers and other service providers.

Wi-Fi Location operates by determining the distance between two Wi-Fi devices—such as an Access Point (AP) and smartphone—by measuring "TOF" or time-of-flight for the wireless signals to travel between the devices, in contrast to extant systems which typically determine indoor location by either measuring RF signal strength (e.g., RSSI) or another related parameter, or so-called "fingerprinting" (i.e., characterizing various portions or regions of the indoor premises as to environment). Meter-level accuracy provided by the Wi-Fi Location technology. A fundamental capability underlying the Wi-Fi location TOF approach is the ability to determine the distance between two Wi-Fi devices by measuring the time that it takes for the wireless signal to propagate from one device to the other with a sufficient level of resolution. The protocol used for message exchanges between the devices regarding the TOF measurements is known as 'Fine Timing Measurement' (FTM) protocol.

Under the Wi-Fi Location protocols, the client device can request that an AP share its location data (e.g., in latitude/longitude, or in other formats such as an address). The protocol enables sharing of such information both pre-association (i.e., before the client device associates with a given AP) and post-association; in this fashion, an AP may have the ability to share its location to clients that are not associated to that AP so as to, inter alia, broaden the potential "coverage" of location-based services. The APs can further share data relating to (i) their vertical "height," such as floor number or a height above a prescribed point with client devices; and (ii) a set of AP locations (such as via a "neighbor report."), which ostensibly increases efficiency of the data exchange protocols by obviating multiple exchanges.

Furthermore, according to the Location protocol: (i) the AP can cause a client to conduct a set of timing measurements, including with other APs; (ii) the AP can request that a client device to report its location; and (iii) the client can request an AP to share a URL or domain name for additional resources (e.g., mapping) data can be obtained.

Moreover, the Wi-Fi Location protocol permits negotiation between a client device and an AP to schedule timing measurements at pre-arranged times, so as to enable inter alia, more power-efficient positioning of devices.

The foregoing features are also elective; i.e., an end user of the client device or the owner of the Wi-Fi network can decide whether they want to participate in Wi-Fi location data message exchanges.

Wi-Fi Location protocols also enable indoor navigation. Generally speaking, multiple Wi-Fi location-capable (i.e., 802.11-2016 compliant) APs are required with in the target building or venue in order to provide such capability. The client device needs to be within wireless range of multiple (typically at least three) APs at any given time so as to enable effective location determination/triangulation. ToF is a geometrical approach, based on estimating the position using the distances from e.g., APs responding to client device requests. Specifically, the distance from each responding device is determined by measuring the round trip time (RTT) from the client device to the responding device and back. This approach further addresses the lack of clock synchronization by measuring round-trip delays. Moreover, in that Wi-Fi indoor environments often contain significant multipath propagation modes, FTM-based ranging purposely includes algorithms for compensating for such indirect paths, including detecting the line-of-sight (LoS) component(s) of the signals. The current 802.11 FTM protocol also allows for performance of measurements at several bands/bandwidths. Parameters such as the number of frames used for measurement can vary as well, with FTM burst length varying between 1 and 32 (0-31).

VoWi-Fi Technology

VoWi-Fi (voice over (EPC-integrated) Wi-Fi) is a technology for utilizing 3G IP multimedia subsystem (IMS) infrastructure for providing packet voice service (e.g., VoIP) via an IP network protocol over a Wi-Fi bearer. The requirements for UE devices and other portions of the network are set forth in, inter alia, (i) GSMA PRD IR.92 IMS Profile for Voice and SMS; (ii) GSMA PRD IR.94 IMS Profile for Conversational Video Service; (iii) GSMA PRD IR.61 WLAN Roaming Guidelines (Inter-Operator Handbook); (iv) GSMA PRD TS.22 Recommendations for Minimal Wi-Fi Capabilities of Terminals; (v) 3GPP TS 24.229 IP multimedia call control protocol based on Session Initiation Protocol (SIP) and Session Description Protocol (SDP); Stage 3; (vi) 3GPP TS 23.402 Architecture enhancements for non-3GPP accesses; (vii) GSMA PRD IR.88 LTE Roaming Guidelines; (viii) 3GPP TS 23.003 Numbering, addressing and identification; (ix) 3GPP TS 33.402 Security aspects for non-3GPP accesses; (x) IETF RFC 4187 Extensible Authentication Protocol Method for 3rd Generation Authentication and Key Agreement (EAP-AKA); (xi) IETF RFC 5448 Improved Extensible Authentication Protocol Method for $3^{rd}$ Generation Authentication and Key Agreement (EAP-AKA); (xii) 3GPP TS 24.302 Access to the 3GPP Evolved Packet Core (EPC) via non-3GPP access networks; Stage 3; (xiii) IETF RFC 5996 Internet Key Exchange Protocol Version 2 (IKEv2); (xiv) 3GPP TS 23.228 IP Multimedia Subsystem (IMS); Stage 2; (xv) 3GPP TS 24.237 IP Multimedia (IM) Core Network (CN) subsystem IP Multimedia Subsystem (IMS) service continuity; Stage 3; and (xvi) 3GPP TS 24.244 Wireless LAN control plane protocol for trusted WLAN access to EPC, each of the foregoing incorporated by reference herein in its entirety.

Additionally, GSMA IR.51 describes the IP Multimedia Subsystem (IMS) Profile for Voice and Video, a profile that sets forth a minimum mandatory set of features of 3GPP specifications that a UE and network are required to implement in order to implement IMS-based telephony and conversational video services over Wi-Fi.

The VoWi-Fi technology is considered complementary to other packet voice technologies such as VoLTE (Voice over LTE), the latter which transmits voice IP packets over an LTE-based data network. In some configurations, VoLTE calls may be seamlessly handed over between an LTE network and a Wi-Fi network. A related technology for so-called "conversational video" is also under development and can be used over Wi-Fi (see e.g., so-called "ViLTE" technology).

Ostensibly, both end users and mobile service providers (e.g., MNOs or mobile network operators) will obtain benefits from VoWi-Fi technology. Specifically, end users can make voice calls without the need for a mobile (cellular) signal, such as in a remote location not served by a cell site, or in a property with construction attributes which limit cellular (e.g., large amounts of steel/concrete, underground, etc.). Even if cellular coverage or signal is present at a given indoor location, the user experience provided by VoWi-Fi (as compared to cellular) may be better, due to e.g., "fast fades" or other impediments to RF cellular signal propagation within the structure which do not affect (or at least have less effect on) the locally disposed 802.11 AP(s) 214 resident within or near the structure.

Moreover, certain enhanced security features may be provided to end users depending on the particular VoWi-Fi implementation, such as where SIM-based authentication (similar to that used for VoLTE referenced supra) is utilized.

End users can also benefit from voice/video telephony services provided by IMS and, inter alia, multimedia telephony (MMTel) applications similar to those used for VoLTE/ViLTE, including providing call control for voice and video, including support for the GSMA standard IR.51 for VoWi-Fi referenced above.

For network operators such as MNOs, new revenue opportunities may be provided by virtue of the VoWi-Fi service, including leveraging existing capabilities otherwise required for normal cellular or other services (e.g., using such extant capabilities to do "double duty" for both cellular and VoWi-Fi services). For example, as previously noted, existing SIM-based security and authentication procedures and infrastructure may be used as part of the VoWi-Fi platform of a given service provider. Similarly, access to IMS-based services otherwise not available may be provided via local Wi-Fi APs at the end user's premises.

Network operators can also aggregate billing and accounting functions within their network(s), such as e.g., issuing a single invoice for the end user for all IMS-based services across different access types.

FIG. 1 shows a typical prior art IMS infrastructure 100 with, inter alia, a PSP (packet switched protocol) network portion 102, Mobile Network Operator (MNO) RAN 104 with multiple eNBs in communication with the PSP 102 via an S1-U interface 105, Neutral Home Network (NHN) portion 107 in communication with the PSP 102 via an S2a interface, and a UE 110 including Subscriber Identity Module (SIM) 111 and LTE air interface 113. The NHN 107 includes multiple NHN RAN eNBs 116 which communicate with a core portion 117 of the NHN 107 via an S1-U interface 120 and S1-MME interface (to the NH gateway and NH Mobility Management Entity or MME, respectively).

As shown in FIG. 2, the PSP 102 of FIG. 1 (shown supporting a typical VoWi-Fi application) includes a Authentication, Authorization and Accounting (AAA) server 202, Home Subscriber Server (HSS) 204, I/S/E-CSCF (Interrogating/Serving/Emergency Call Session Control Functions) 206, Proxy CSCF (P-CSCF) 207, LRF/GMLC (Location Retrieval Function/Gateway Mobile Location Center) 208, packet gateway (P-GW) 210, and ePDG 211. One or more WAPs (e.g., Wi-Fi compliant APs) 214 are in communication with the ePDG 211 via an SWu interface 212; the ePDG 211 backhauls to the P-GW 210 via an S2b interface as shown.

In operation, the foregoing entities support authentication of the UE to the network, establishment and operation of the packet call session (e.g., per SIP and RTP/RTCP), and storage of data relating to IMS users/UEs. Specifically, the UE in the architecture 200 described above returns a MAC/UE address combination via SIP messaging.

However, the foregoing architecture does not explicitly support "meter resolution" location services such as Wi-Fi Location/FTM; rather, location-based services (including explicitly emergency calls) are required to be supported via the corresponding cellular bearer/access (e.g., 3G voice capability).

In that service providers such as cable, terrestrial, fiber or satellite MSOs are increasingly providing indoor wireless services (e.g., IEEE 802.11-2016-compliant APs with FTM capability as described above) which may be for instance integrated with other devices provided by the MSO such as modems, gateways or routers, or alternatively purchased as OEM devices (e.g., from an electronics retailer), there is, among others, a need to leverage these devices for provision both of MSO-provided location-based services and non-MSO provided location-based services. Specifically, users within a premises served by an MSO modem or gateway (e.g., subscribers of the MSO, or merely "incidental" or opportunistic users present within an MSO-served venue) may employ various combinations of equipment, backhaul, and service provider, including e.g.: (i) use MSO-provided Wi-Fi AP(s) and backhaul (e.g., DOCSIS modem through MSO core) for location-based services provided by that MSO (hereinafter "MSO end-to-end location services"); (ii) use OEM-provided or "COTS" Wi-Fi AP(s) and MSO backhaul for location-based services provided by the serving MSO (hereinafter "MSO/OEM location services"); (iii) use MSO-provided Wi-Fi AP(s) and backhaul for location-based services provided by an entity other than the MSO (hereinafter "MSO/third party location services"); or (iv) use OEM-provided Wi-Fi AP(s) and MSO backhaul for location-based services provided by a third party (hereinafter "OEM/MSO/third party location services").

Hence, depending on the use case (or cases) above that are employed in a particular scenario, an MSO or MSO proxy entity, or third party service provider may need access to "meter level" location-data for providing services such as location-based delivery of good or services within an MSO-served premises, or provision of location data of a user device for emergency services within that premises, whether the service is provided by the MSO (e.g., targeted content delivery to particular platforms), or otherwise (e.g., emergency responders, pizza deliverers, etc.).

Notably, current art allows for location of a WLAN AP at a gross level of resolution (e.g., a given AP with BSSID/MAC could feasibly be associated with a subscriber account located at a given premises, such as via access of an MSO or other service provider database which correlates the subscriber's service address to the particular device identifying data. However, this level of resolution is insufficient in many applications or scenarios, such as e.g., a densely packed apartment building or enterprise. Any number of different UEs operating in different apartments/offices in such scenarios could feasibly associate with an AP that is not specifically within their premises. For instance, "public" Wi-Fi in an apartment complex could serve UEs located up to say 100 feet away, thereby making knowledge of the location of the AP effectively useless for providing the aforementioned location-based services (i.e., resolving the location to the degree necessitated by such services).

Moreover, MNO subscribers (e.g., those subscribing to LTE data services provided by an MNO of the type previously described) may desire or require connectivity between the MSO-served premises and AP(s) therein, or public APs, for, e.g., authentication of the user under the VoWi-Fi paradigm.

Currently, no viable architecture for providing the foregoing level of location accuracy or connectivity in such use cases is available. Accordingly, improved apparatus and methods are needed to, inter alia, enable an unlicensed wireless (e.g., Wi-Fi) service provider to facilitate internal and third-party indoor location-based services, including VoWi-Fi calls, including for example those made from premises served (at least backhauled) by the MSO.

SUMMARY

The present disclosure addresses the foregoing needs by providing, inter alia, methods and apparatus for providing wireless services (including location-based services) to MSO users, as well as others such as e.g., users/subscribers of one or more MNOs.

In one aspect, a method for providing a wireless location-based service to a user of a mobile device is disclosed. In one embodiment, the method includes: at least temporarily registering the mobile device with a wireless network infrastructure; establishing a communications session between the mobile device and an entity via at least the wireless network infrastructure; receiving, at a first component of the wireless network infrastructure, data relating to a location of the mobile device; accessing the first component of the wireless network infrastructure using at least a second component of the wireless network infrastructure, the accessing comprising accessing the received data relating to the location of the mobile device; and communicating the accessed data to the entity or a proxy thereof, the communicated accessed data enabling provision of the location-based service to the user.

In one variant, the wireless network infrastructure includes an IMS (IP Multimedia System) enabled infrastructure and at least one wireless access point (WAP), and the at least temporarily registering the mobile device with a wireless network infrastructure includes authenticating and registering the mobile device according to one or more IMS protocols. The communication session includes a communications session configured to support communication of Internet Protocol (IP) packet data.

In one implementation, the first component includes the at least one WAP, the at least one WAP compliant with IEEE Std. 802.11-2016; and the communication of Internet Protocol (IP) packet data includes communication of packetized voice data, the communication of the voice data pursuant to a VoWi-Fi (Voice over Wi-Fi) communications session.

In another variant, the communicating the accessed data to the entity or a proxy thereof, includes: receiving from a second component an HTTP (hypertext transfer protocol) GET request message for the received data; generating a response to the GET request message, the response comprising at least a portion of the received data; and causing transmission of the response to the second component.

In one implementation, the receiving from a second component an HTTP GET includes receiving the HTTP GET from a 3GPP ePDG (evolved Packet Data Gateway) of the wireless network infrastructure; and the communicating the accessed data to the entity or a proxy thereof includes communicating the accessed data to the entity or the proxy via at least a call session control function (CSCF) of the wireless network infrastructure. The at least temporarily registering includes the CSCF causing storing of data within a home subscriber server (HSS) of the wireless network infrastructure, and the data includes storing a derived value (e.g., at least a portion of each of: (i) a MAC address of the at least one WAP, and (ii) an IMEI (International Mobile Equipment Identifier) of the mobile device. Access of the received data relating to the location of the mobile device includes: obtaining the stored at least a portion of each of: (i) a MAC address of the at least one WAP, and (ii) an IMEI (International Mobile Equipment Identifier) of the mobile device from the HSS; providing the obtained at least a portion of each of: (i) a MAC address of the at least one WAP, and (ii) an IMEI (International Mobile Equipment Identifier) of the mobile device to the ePDG; and providing the obtained at least a portion of each of: (i) a MAC address of the at least one WAP, and (ii) an IMEI (International Mobile Equipment Identifier) of the mobile device to the first component from the ePDG.

In a further variant, the method further comprising verifying, via one or more computer programs of the first component, the provided at least portion of each of: (i) a MAC address of the at least one WAP, and (ii) an IMEI (International Mobile Equipment Identifier) of the mobile device against data previously stored by the first component.

In yet another variant, the receiving data relating to the location includes receiving data relating to at least one fine timing measurement (FTM) conducted by the mobile device, and the method further includes determining the location based at least on the received data relating to at least one fine timing measurement (FTM).

In still another variant of the method, the receiving data relating to the location includes receiving data enabling performance of at least one fine timing measurement (FTM), and the method further includes: performing the at least one FTM based on the received data; and determining the location based at least in part on the at least one FTM. The performing the at least one FTM and the determining the location are performed by the first component.

In yet a further variant, the receiving data relating to the location includes receiving data associated with at least one fine timing measurement (FTM), and the method further includes the entity or a proxy thereof performing a determination of the location after the communicating of the accessed data associated with at least one fine timing measurement (FTM) to the entity.

In another embodiment, the method for providing a wireless location-based service to a user of a mobile device includes: providing first data specific to the mobile device to a first network infrastructure, the provided first data enabling at least temporary registering of the mobile device within the first network infrastructure; providing second data specific to at least one of: (i) the mobile device, and/or (ii) the user, to a managed network infrastructure, the provided second data enabling authentication of at least one of: (i) the mobile device, and/or (ii) the user, to the managed network infrastructure; causing establishment of a communication session between the mobile device and an entity via at least portions of both the first network infrastructure and the managed network infrastructure; and providing wireless location-related data to a first component of the first network infrastructure, the location-related data useful by the entity as part of the communication session for causing provision of the location-based service to the user at the determined location.

In one variant, the location-related data includes FTM data enabling determination of a location of the mobile device by the first component.

In another variant, the first data specific to the mobile device comprises at least portion of the TMSI; and the providing second data specific to at least one of: (i) the mobile device, and/or (ii) the user, to a managed network infrastructure, includes providing the device IMEI to the managed network infrastructure.

In another variant, the providing the FTM data to a first component includes: receiving at the first component, and from a second component of the first network infrastructure, an HTTP (hypertext transfer protocol) GET request message for the received FTM data; generating a response to the GET request message, the response comprising at least a portion pf the received FTM data; and causing transmission of the response to the second component. In one implementation, the mobile device includes an application computer program operative to execute thereon; and the providing second data specific to at least one of: (i) the mobile device, and/or (ii) the user, to a managed network infrastructure, includes providing the second data to a server of the managed network infrastructure via a secure data session established between the application computer program and the server.

In another aspect of the disclosure, network apparatus for use within a first network is disclosed. In one embodiment, the network apparatus is configured to at least temporarily register one or more Wi-Fi enabled mobile devices using at least a portion of 3GPP IMS-enabled infrastructure, and includes: (i) a wireless access point (WAP), (ii) an ePDG function, (iii) a home subscriber server (HSS), and (iv) AAA server in data communication, wherein the network apparatus is configured to use at least portions of data unique to the WAP and the mobile device to perform the registration. The stored registration data is then obtained by the ePDG, and used to access location data resident within the WAP (e.g., 802.11 FTM data) for determining mobile device location.

In an additional aspect of the disclosure, computer readable apparatus is described. In one embodiment, the apparatus includes a storage medium configured to store one or more computer programs, and includes a program memory or HDD or SSD on a computerized device such as the eDPG. In one variant, the one or more computer programs are configured to: receive mobile device-specific data from a WAP; cause storage of the received data within a network infrastructure, and subsequently call for and use the stored data for accessing the WAP for location information relating to the mobile device.

In another embodiment, the apparatus includes a storage medium configured to store one or more computer programs, and includes a program memory or HDD or SSD on a computerized mobile device such as a 3GPP-compliant UE (user equipment). In one variant, the one or more computer programs include an MSO-provided application program configured to enable registration of the UE within an MSO infrastructure. In one implementation, the MSO infrastructure cooperates with an IMS infrastructure of an MNO to provide location data relating to the UE via at least portions of both the MSO and MNO networks.

In a further aspect, a wireless access point (WAP) is disclosed. In one embodiment, the WAP comprises a computer program operative to execute on a digital processor apparatus, and configured to, when executed, obtain data relating to a unique identifier of a WLAN-enabled mobile device; form a second unique identifier based at least in part on the unique identifier of the device; and receive and service requests issued according to a prescribed protocol to access location-related data for the mobile device. In one variant, the WAP is an IEEE 802.11 2016 compliant Wi-Fi AP, and the location-related data includes FTM data. The WAP receives HTTP(s) GET requests issued by the network infrastructure (e.g., IMS ePDG) for the FTM data.

These and other aspects shall become apparent when considered in light of the disclosure provided herein.

BRIEF DESCRIPTION OF THE DRAWINGS

FIG. 4a is a logical block diagram of a first exemplary embodiment of an IMS system supporting location-based services, according to the present disclosure.

Figure 1:
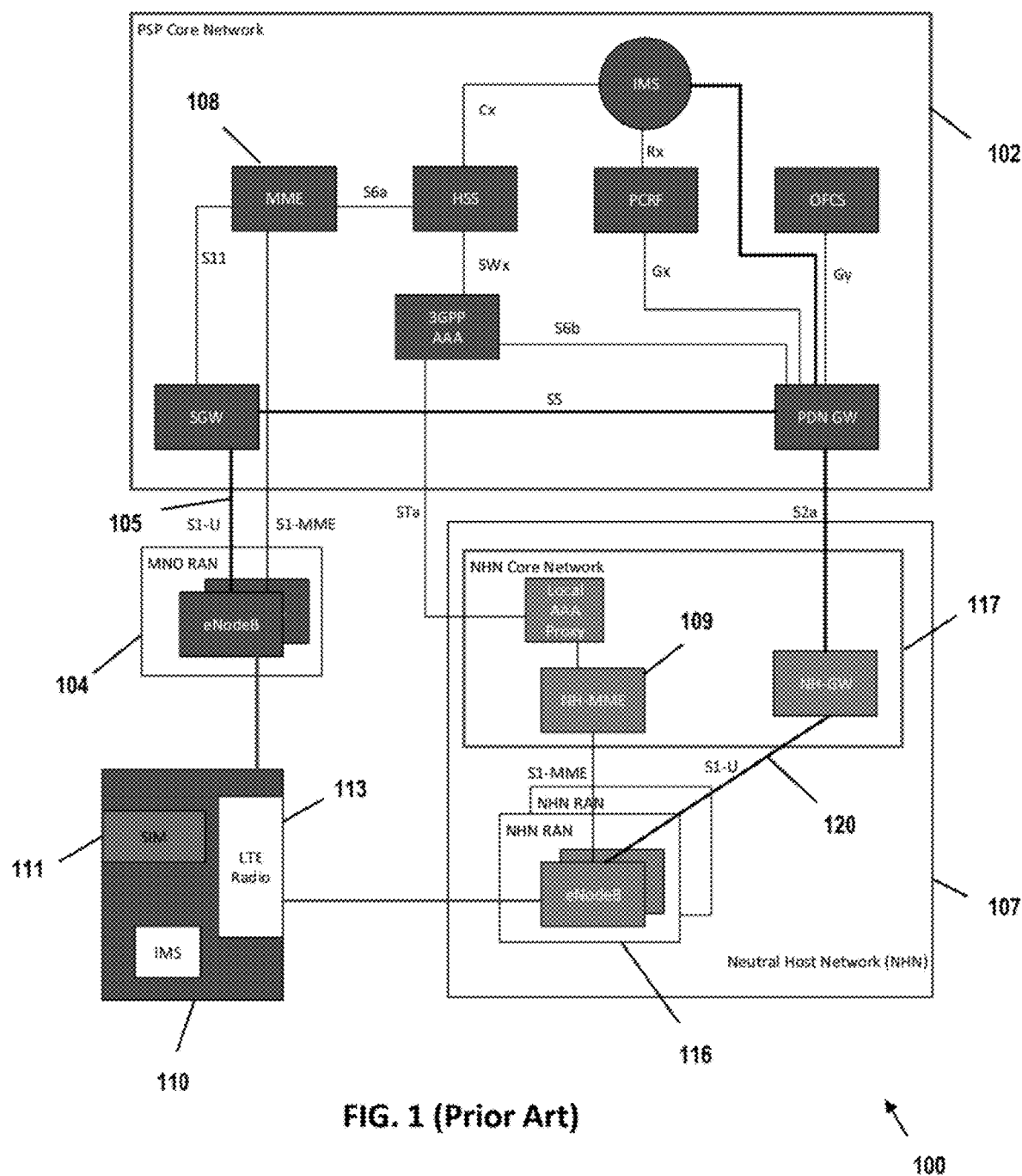
FIG. 1 is a functional block diagram of a typical prior art 3GPP MNO and NHN network architecture.

All figures © Copyright 2017 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "codec" refers to a video, audio, or other data coding and/or decoding algorithm, process or apparatus including, without limitation, those of the MPEG (e.g., MPEG-1, MPEG-2, MPEG-4/H.264, H.265, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, and other wireless data standards.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums. The term "MNO" as used herein is further intended to include MVNOs, MNVAs, and MVNEs.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "subscriber identity module" or SIM refers without limitation to SIM cards, mini-SIM cards, and electronic SIMs (eSIMs) and virtual SIMs (v SIMs).

As used herein, the term "Wi-Fi" refers to, without limitation and as applicable, any of the variants of IEEE Std. 802.11 or related standards including 802.11 a/b/g/n/s/v/ac/ax, 802.11-2012/2013 or 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, analog cellular, CDPD, satellite systems, millimeter wave or microwave systems, acoustic, and infrared (i.e., IrDA).

Overview

In one exemplary aspect, the present disclosure provides improved methods and apparatus for providing wireless location-based services, especially those requiring a prescribed level of accuracy and/or which are capable of operating indoors or underground (or in other applications which cannot be served by traditional positioning systems such as GPS/A-GPS or GLONASS).

In one embodiment, incipient "meter level" accuracy indoor positioning technologies such as Wi-Fi Location/FTM are leveraged to enable an MSO to rapidly obtain and forward (if required) location data on a user device (e.g., LTE-enabled UE with SIM capability) within an MSO-served premises or venue such that the UE can be located to within a prescribed level of accuracy, and one more services provided based thereon. In one variant, an MNO (or MSO) managed 3GPP IP Multimedia System (IMS) infrastructure is also leveraged to at least temporarily store and retrieve UE-specific identifiers under control of a controller entity (e.g., ePDG) in communication with the IMS infrastructure and one or more FTM-enabled Wi-Fi APs within the premises or venue. In this fashion, a "roaming" MNO subscriber with Wi-Fi-capable UE can authenticate, and provide precise indoor location data, via an MSO or OEM AP(s) and MSO network, the data ultimately forwarded to e.g., a VoWi-Fi call endpoint such as a 911 or 411 service.

In one implementation, the controller entity (e.g., ePDG) and AP(s) are configured to utilize an HTTP/S "GET" protocol to obtain and access the UE-specific location data (e.g., that obtained pursuant to 802.11-2016 FTM protocols). In another implementation, an MSO-provided application computer program is resident on the UE and used to, inter alia, authenticate the UE to the MSO as an MSO subscriber, thereby enabling provision of MSO-enabled or MSO-specific services such as spatially targeted content delivery, or enhancements to third party services (e.g., provision of topically relevant data or information to a user placing a VoWi-Fi location services reliant call).

DETAILED DESCRIPTION OF EXEMPLARY EMBODIMENTS

Exemplary embodiments of the apparatus and methods of the present disclosure are now described in detail. While these exemplary embodiments are described in the context of the previously mentioned wireless access points (e.g., WLAN APs) associated with or supported at least in part by a managed network (e.g., hybrid fiber coax (HFC) cable architecture having a multiple systems operator (MSO), digital networking capability, IP delivery capability, and a plurality of client devices), the general principles and advantages of the disclosure may be extended to MNO networks (e.g., those of cellular/data service providers, such as via upgrades to existing IMS and other related infrastructure), and/or other types of radio access technologies ("RATs"), networks and architectures that are configured to deliver digital data (e.g., text, images, games, software applications, video and/or audio). Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., outdoors, commercial/retail, or enterprise domain (e.g., businesses), or even governmental uses. Yet other applications are possible.

Also, while certain aspects are described primarily in the context of the well-known Internet Protocol (described in, *inter alia, Internet Protocol DARPA Internet Program Protocol Specification*, IETF RCF 791 (September 1981) and Deering et al., *Internet Protocol, Version 6* (IPv6) Specification, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Service Provider Network—

Figure 3:
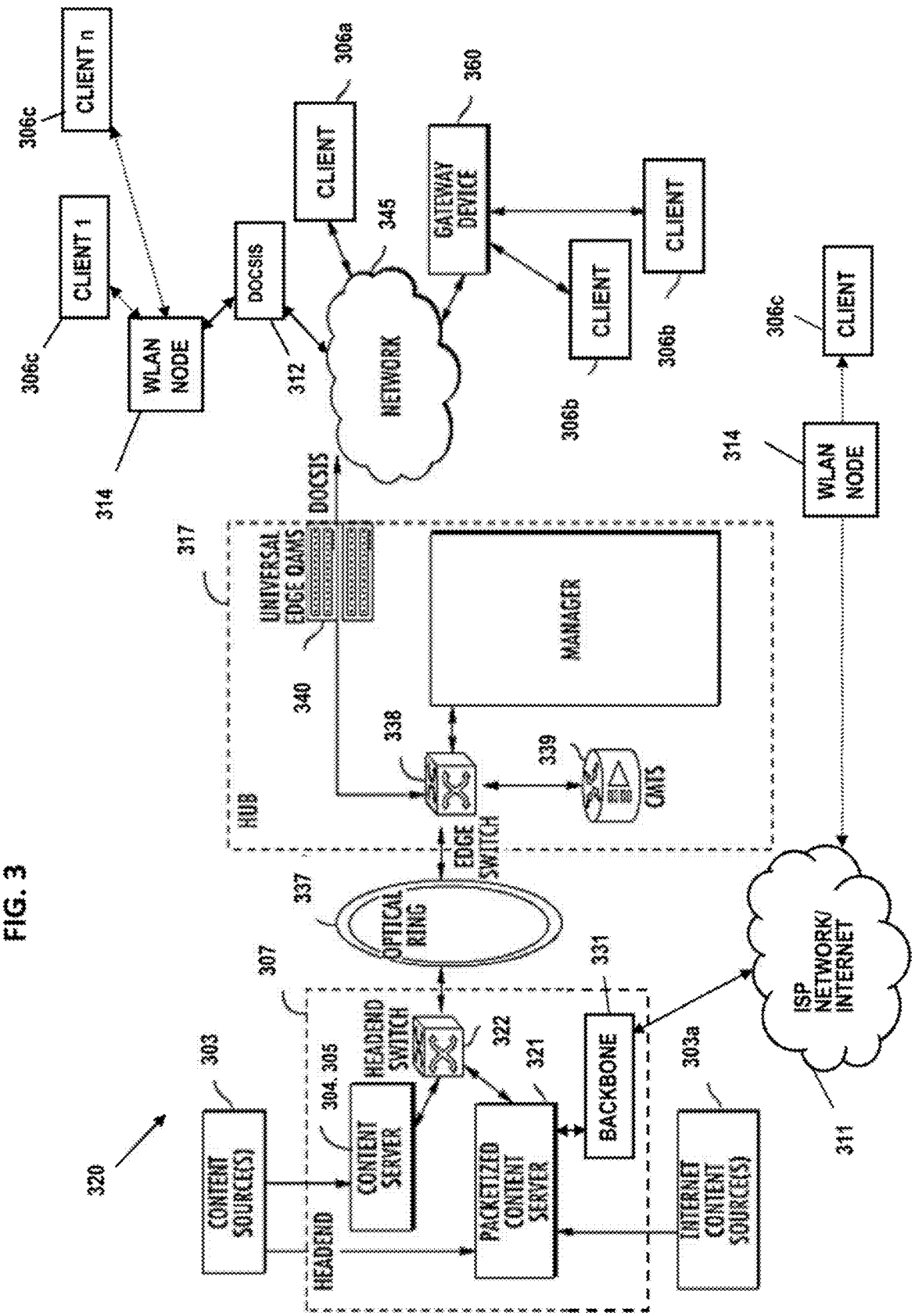
FIG. 3 is a functional block diagram of an exemplary MSO network architecture useful in conjunction with various features described herein.

FIG. 3 illustrates a typical service provider network configuration useful with the features of the location-based services apparatus and methods described herein. This service provider network 320 is used in one embodiment of the disclosure to provide backbone and Internet access from the service provider's wireless access nodes (e.g., Wi-Fi APs or base stations 314 operated or maintained by the service provider or its customers/subscribers), one or more stand-alone or embedded cable modems (CMs) 312 in data communication therewith, or even third party access points accessible to the service provider via, e.g., an interposed network such as the Internet 311 (e.g., with appropriate permissions from the access node owner/operator/user).

In certain embodiments, the service provider network 320 also advantageously permits the aggregation and/or analysis of subscriber- or account-specific data (including inter alia, particular mobile devices associated with such subscriber or accounts) as part of the provision of services to users under the exemplary delivery models described herein. As but one example, device-specific IDs (e.g., IMEI, MAC address or the like) can be cross-correlated to MSO subscriber data maintained at e.g., the network head end(s) 307 so as to permit or at least facilitate, among other things, (i) user authentication to the MSO network; (ii) correlation of aspects of the premises or venue where service is provided to particular subscriber capabilities, demographics, or equipment locations, such as for delivery of location-specific or targeted content or advertising; and (iii) determination of subscription level, and hence subscriber privileges and access to certain services as applicable. Moreover, device profiles for particular user devices can be maintained by the MSO, such that the MSO (or its automated proxy processes) can model the user device for wireless capabilities.

The MSO network architecture 320 of FIG. 3 is particularly useful for the delivery of packetized content (e.g., encoded digital content carried within a packet or frame structure or protocol) consistent with the various aspects of the present disclosure. In addition to on-demand and broadcast content (e.g., live video programming), the system of FIG. 3 may deliver Internet data and OTT (over-the-top) services to the end users (including those of the access nodes 314) via the Internet protocol (IP) and TCP, although other protocols and transport mechanisms of the type well known in the digital communication art may be substituted.

The network architecture 320 of FIG. 3 generally includes one or more headends 307 in communication with at least one hub 317 via an optical ring 337. The distribution hub 317 is able to provide content to various user/client devices 306, and gateway devices 360 as applicable, via an interposed network infrastructure 345.

Various content sources 303, 303a are used to provide content to content servers 304, 305 and origin servers 321. For example, content may be received from a local, regional, or network content library as discussed in co-owned U.S. Pat. No. 8,997,136 entitled "APPARATUS AND METHODS FOR PACKETIZED CONTENT DELIVERY OVER A BANDWIDTH-EFFICIENT NETWORK", which is incorporated herein by reference in its entirety. Alternatively, content may be received from linear analog or digital feeds, as well as third party content sources. Internet content sources 303a (such as e.g., a web server) provide Internet content to a packetized content origin server(s) 321. Other IP content may also be received at the origin server(s) 321, such as voice over IP (VoIP) and/or IPTV content. Content may also be received from subscriber and non-subscriber devices (e.g., a PC or smartphone-originated user made video).

The centralized media server(s) 321, 304 located in the headend 307 may also be replaced with or used in tandem with (e.g., as a backup) to hub media servers (not shown) in one alternative configuration. By distributing the servers to the hub stations 317, the size of the fiber transport network associated with delivering VOD services from the central headend media server is advantageously reduced. Multiple paths and channels are available for content and data distribution to each user, assuring high system reliability and enhanced asset availability. Substantial cost benefits are derived from the reduced need for a large content distribution network, and the reduced storage capacity requirements for hub servers (by virtue of the hub servers having to store and distribute less content).

It will also be recognized that a heterogeneous or mixed server approach may be utilized consistent with the disclosure. For example, one server configuration or architecture may be used for servicing cable, satellite, etc., subscriber CPE-based session requests (e.g., from a user's DSTB or the like), while a different configuration or architecture may be used for servicing mobile client requests. Similarly, the content servers 321, 304 may either be single-purpose/dedicated (e.g., where a given server is dedicated only to servicing certain types of requests), or alternatively multi-purpose (e.g., where a given server is capable of servicing requests from different sources).

The network architecture 320 of FIG. 3 may further include a legacy multiplexer/encrypter/modulator (MEM; not shown). In the present context, the content server 304 and packetized content server 321 may be coupled via a LAN to a headend switching device 322 such as an 802.3z Gigabit Ethernet (or "10G") device. For downstream delivery via the MSO infrastructure (i.e., QAMs), video and audio content is multiplexed at the headend 307 and transmitted to the edge switch device 338 (which may also comprise an 802.3z Gigabit Ethernet device) via the optical ring 337.

In one exemplary content delivery paradigm, MPEG-based video content (e.g., MPEG-2, H.264/AVC) may be delivered to user IP-based client devices over the relevant physical transport (e.g., DOCSIS channels); that is as MPEG-over-IP-over-MPEG. Specifically, the higher layer MPEG or other encoded content may be encapsulated using an IP network-layer protocol, which then utilizes an MPEG packetization/container format of the type well known in the art for delivery over the RF channels or other transport, such as via a multiplexed transport stream (MPTS). In this fashion, a parallel delivery mode to the normal broadcast delivery exists; e.g., in the cable paradigm, delivery of video content both over traditional downstream QAMs to the tuner of the user's DSTB or other receiver device for viewing on the television, and also as packetized IP data over the DOCSIS QAMs to the user's PC or other IP-enabled device via the user's cable modem 312 (including to end users of the access node 314). Delivery in such packetized modes may be unicast, multicast, or broadcast.

Delivery of the IP-encapsulated data may also occur over the non-DOCSIS QAMs, such as via IPTV or similar models with QoS applied.

Individual client devices such as cable modems 312 and associated end-user devices 306a, 306b of the implementation of FIG. 3 may be configured to monitor the particular assigned RF channel (such as via a port or socket ID/address, or other such mechanism) for IP packets intended for the subscriber premises/address that they serve. The IP packets associated with Internet services are received by edge switch, and forwarded to the cable modem termination system (CMTS) 339. The CMTS examines the packets, and forwards packets intended for the local network to the edge switch. Other packets are in one variant discarded or routed to another component.

The edge switch forwards the packets receive from the CMTS to the QAM modulator, which transmits the packets on one or more physical (QAM-modulated RF) channels to the client devices. The IP packets are typically transmitted on RF channels that are different than the "in band" RF channels used for the broadcast video and audio programming, although this is not a requirement. As noted above, the premises devices such as cable modems 312 are each configured to monitor the particular assigned RF channel (such as via a port or socket ID/address, or other such mechanism) for IP packets intended for the subscriber premises/address that they serve.

In one embodiment, both IP data content and IP-packetized audio/video content is delivered to a user via one or more universal edge QAM devices 340. According to this embodiment, all of the content is delivered on DOCSIS channels, which are received by a premises gateway 360 or cable modem 312, and distributed to one or more respective client devices/UEs 306a, 306b, 306c in communication therewith.

In one implementation, the CM 312 shown in FIG. 3 services a premises or venue, such as a conference center or hospitality structure (e.g., hotel), which includes one or more WLAN (e.g., 802.11-2016 compliant Wi-Fi) nodes 314b for WLAN access (e.g., within 2.4 GHz ISM band).

In parallel with (or in place of) the foregoing delivery mechanisms, the MSO backbone 331 and other network components can be used to deliver packetized content to the user's mobile client device 306c via non-MSO networks. For example, so-called "OTT" content (whether tightly coupled or otherwise) can be ingested, stored within the MSO's network infrastructure, and delivered to the user's mobile device via an interposed ISP (Internet Service Provider) network and public Internet 311 (e.g., at a local coffee shop, via a Wi-Fi AP connected to the coffee shop's ISP via a modem, with the user's IP-enabled end-user device 306c utilizing an Internet browser or MSO/third-party app to stream content according to an HTTP-based approach).

Wireless Services Architecture—

Figure 4:
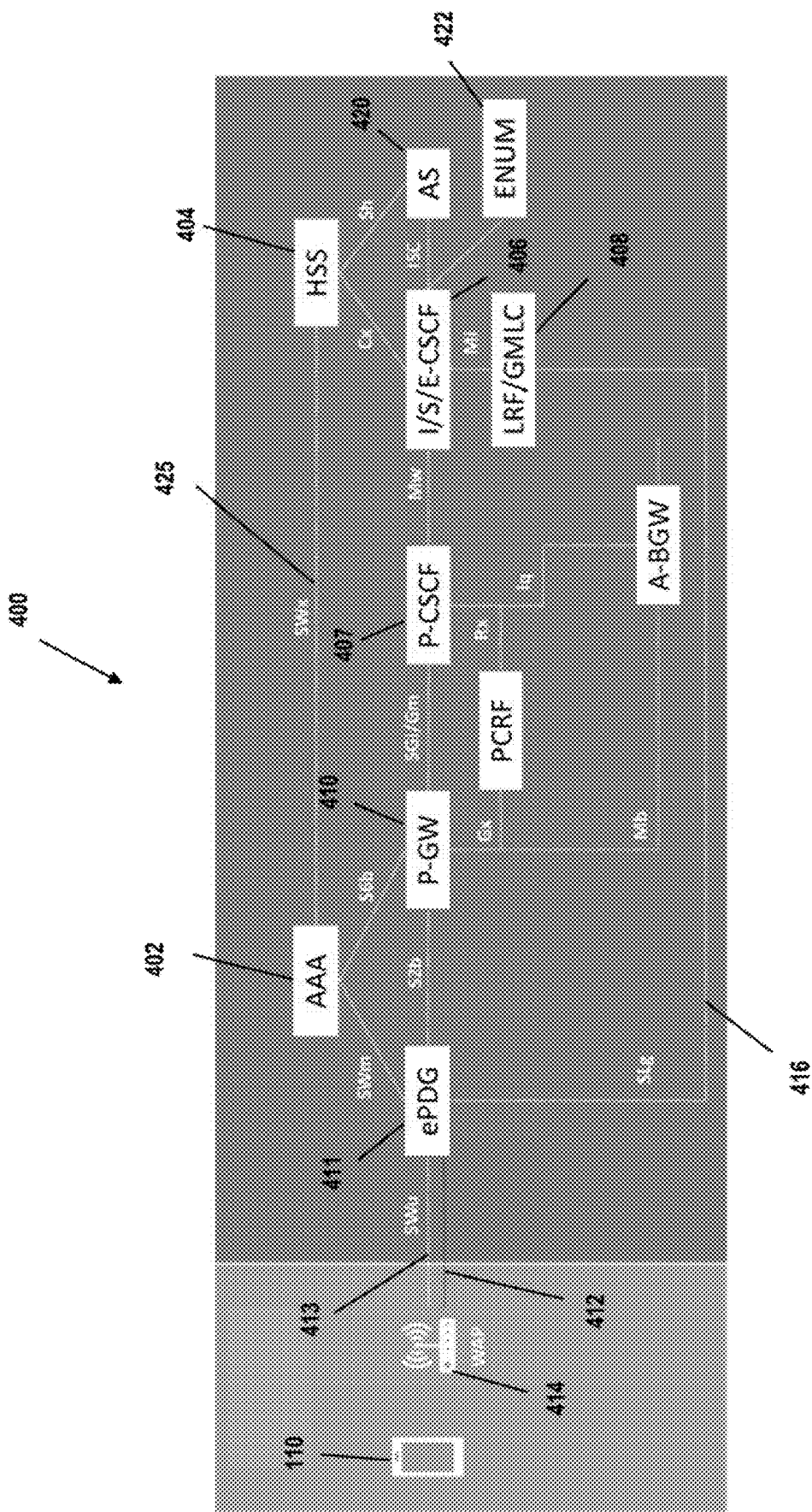
FIG. 4 is a functional block diagram of a first exemplary embodiment of a packet-based location determination architecture according to the present disclosure.

FIG. 4 illustrates an exemplary embodiment of a network architecture 400 useful in implementing the location determination methods of the present disclosure. As used in the present context, the term "users" may include without limitation end users (e.g., individuals, whether subscribers of the MSO network, the MNO network, or other), venue operators, third party service providers, or even entities within the MSO itself (e.g., a particular department, system or processing entity).

Figure 2:
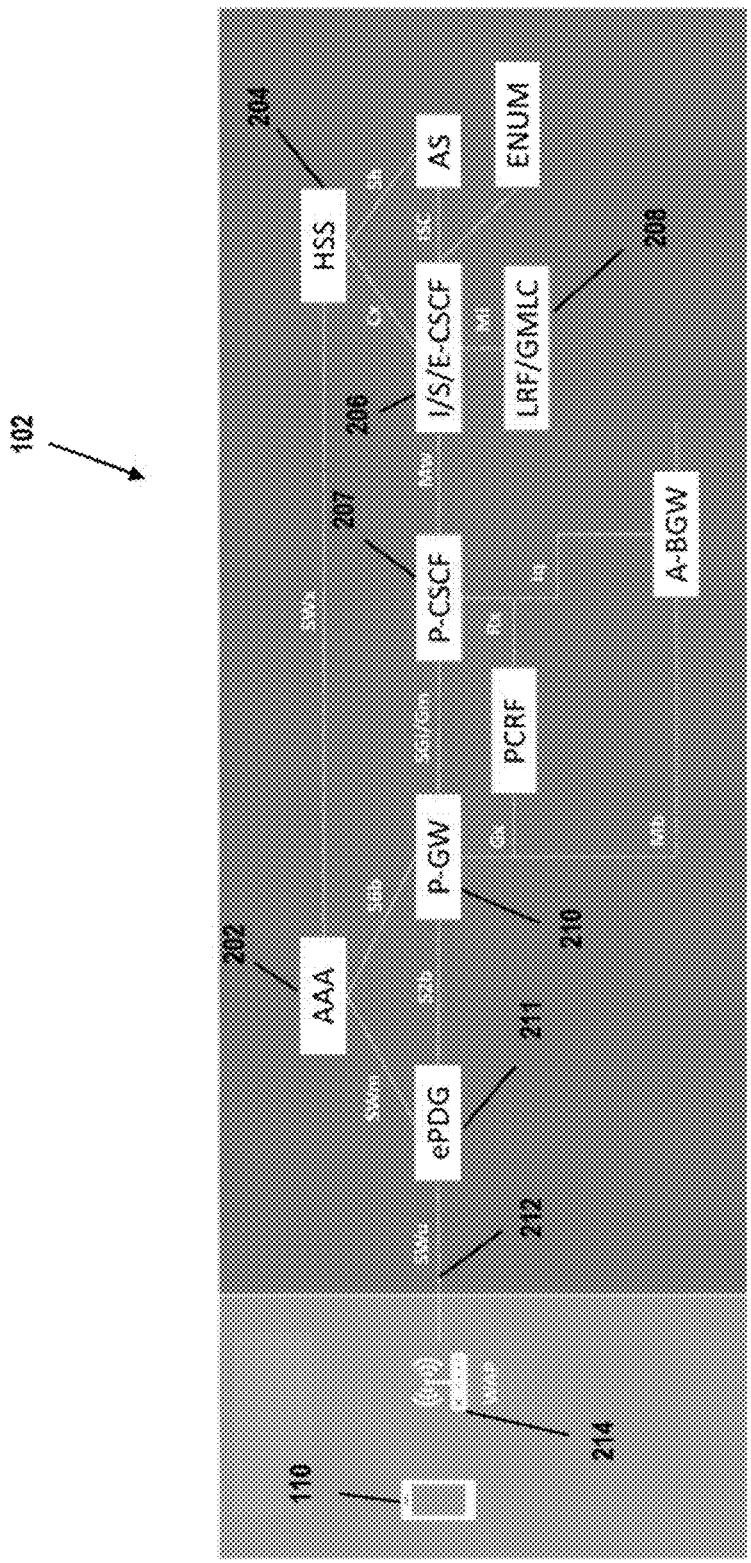
FIG. 2 is a functional block diagram of a typical prior art 3GPP IMS architecture configured to support VoWi-Fi services.

Specifically, FIG. 4 illustrates an exemplary VoWi-Fi architecture 400 utilizing 3G IP multimedia subsystem (IMS) infrastructure for providing packet voice service (e.g., VoIP) via an IP network protocol over a Wi-Fi bearer. Consistent with the prior art implementation of FIG. 2 discussed above, the requirements for UE devices and other portions of the network are set forth in, inter alia, (i) GSMA PRD IR.92 IMS Profile for Voice and SMS; (ii) GSMA PRD IR.94 IMS Profile for Conversational Video Service; (iii) GSMA PRD IR.61 WLAN Roaming Guidelines (Inter-Operator Handbook); (iv) GSMA PRD TS.22 Recommendations for Minimal Wi-Fi Capabilities of Terminals; (v) 3GPP TS 24.229 IP multimedia call control protocol based on Session Initiation Protocol (SIP) and Session Description Protocol (SDP); Stage 3; (vi) 3GPP TS 23.402 Architecture enhancements for non-3GPP accesses; (vii) GSMA PRD IR.88 LTE Roaming Guidelines; (viii) 3GPP TS 23.003 Numbering, addressing and identification; (ix) 3GPP TS 33.402 Security aspects for non-3GPP accesses; (x) IETF RFC 4187 Extensible Authentication Protocol Method for 3rd Generation Authentication and Key Agreement (EAP-AKA); (xi) IETF RFC 5448 Improved Extensible Authentication Protocol Method for $3^{rd}$ Generation Authentication and Key Agreement (EAP-AKA); (xii) 3GPP TS 24.302 Access to the 3GPP Evolved Packet Core (EPC) via non-3GPP access networks; Stage 3; (xiii) IETF RFC 5996 Internet Key Exchange Protocol Version 2 (IKEv2); (xiv) 3GPP TS 23.228 IP Multimedia Subsystem (IMS); Stage 2; (xv) 3GPP TS 24.237 IP Multimedia (IM) Core Network (CN) subsystem IP Multimedia Subsystem (IMS) service continuity; Stage 3; and (xvi) 3GPP TS 24.244 Wireless LAN control plane protocol for trusted WLAN access to EPC, each of the foregoing previously incorporated by reference herein. Additionally, the exemplary architecture of FIG. 4 is compliant with the GSMA IR.51 IP Multimedia Subsystem (IMS) Profile for Voice and Video.

However, the architecture 400 of FIG. 4 also includes several modifications and/or additions which enable access of location-based data relevant to one or more UEs operating within the wireless (Wi-Fi) RAN of the architecture by e.g., other components of the infrastructure, and/or external entities, as now described in greater detail. Specifically, the architecture of FIG. 4 includes an Authentication, Authorization and Accounting (AAA) server 402, Home Subscriber Server (HSS) 404, I/S/E-CSCF (Interrogating/Serving/Emergency Call Session Control Functions) 406, Proxy CSCF (P-CSCF) 407, LRF/GMLC (Location Retrieval Function/Gateway Mobile Location Center) 408, packet gateway (P-GW) 410, and ePDG 411. One or more IEEE Std. 802.11-2016 compliant APs 414 with FTM capability are in communication with the ePDG 411 via an SWu interface 413, as well as an added HTTP(S) interface 412 as described in greater detail below. The ePDG 411 backhauls to the P-GW 410 via an S2b interface as shown, and an SLg interface 416 between the ePDG 411 and the LRF/GMLC 408 is also provided (i.e., the ePDG supports the extant SLg normally used between the LRF/GMLC and the MME 108 or NH-MME 109 (see FIG. 1). Notably, the ePDG 411 in the embodiment of FIG. 4 is enhanced to support the SLg interface 416, and an HTTP(s)-based protocol is implemented for retrieving location data from the Wi-Fi access point(s) 414 on demand. Specifically, in the illustrated embodiment, the ePDG 411 fetches the location data from the 802.11-2016 enabled Wi-Fi access point(s) via the HTTP(S) protocol directly, and provides the data to the LRF/GMLC 408 using the SLg interface 416.

The Wi-Fi AP 414 and ePDG 411 are advantageously configured to support the added HTTP(S) protocol via a RESTful (Representation State Transfer) interface 412 to enable retrieving the location data. RESTful services or interfaces allow requesting systems to access and manipulate prescribed representations of "resources" (e.g., data, files, URLs, etc.) using a predefined set of stateless operations. Hence, the use of a RESTful interface in the exemplary embodiment of FIG. 4 advantageously simplifies the maintenance and operation of the ePDG and WAP interface 412, in that no state information need be maintained to support this GET operation. The ePDG 411 can simply use the GET request at any time to obtain the desired FTM-based location data from the WAP(s) 414.

In certain embodiments, each WAP 414 is located within and/or services one or more areas within one or more premises or venues (e.g., a building, room, or plaza for commercial, corporate, academic purposes, and/or any other space suitable for WLAN wireless access). Each WAP 414 is configured to provide wireless network coverage within its coverage or connectivity range.

As described in greater detail below with respect to FIG. 5, once a given UE 110 has successfully attached to a given AP 414, the aforementioned RESTful HTTP(S) based interface is used by ePDG to access and retrieve the location data from that WAP 414 to inform the LRF/GMLC 408 of the location of the UE.

In one implementation, security of the new interface 412 between the ePDG 411 and WAP 414 is accomplished using the HTTPS protocol, although it will be appreciated by those of ordinary skill given the present disclosure that other mechanisms for data security can be employed in place of or in tandem with the aforementioned HTTPS protocol. As is known, the HTTP Secure (HTTPS) protocol is a modification of the basis Hypertext Transfer Protocol (HTTP) to enable secure communication over a computer network. In HTTPS, the data communications are encrypted by Transport Layer Security (TLS) or its predecessor, Secure Sockets Layer (SSL) security processes. HTTPS, inter alia, authenticates an accessed entity or website to provide privacy and integrity protection of the exchanged data, including for protection against man-in-the-middle (MITM) attacks. Bi-directional encryption of communications between e.g., a client and server protects against eavesdropping and tampering of the communication, thereby providing at least some level of reasonable assurance that one is communicating without interference by attackers with the intended target entity/server. In the architecture 400 of FIG. 4, the communications between the ePDG 411 and WAP(s) 414 including transmission of the UE-specific location data, is protected, in that divulgence of such data to surreptitious third parties is highly undesirable (e.g., it in effect pinpoints a location of a given UE, and hence by extension a given user, to a precise location at a precise time, and hence could be used for a variety of nefarious purposes).

In one implementation, the RESTful HTTP(s) request GET method utilizes a Request/Response protocol as shown in Table 4 below:

TABLE 4

| HTTP Message Type | Example Protocol |
|---|---|
| Request | https://[wap_ip_address]:[port]/wap/v1/retrieveLocation?deviceIdentifier=identifier_value |
| Response | {"result": [UE Location]} |

In the example of Table 4, the "device identifier" is formed using (i) the MAC address of the target WAP, and (ii) the IMEI number of the target UE, although it will be appreciated that other data and/or combinations may be used for this function. Specifically, in one variant, the device identifier includes the MAC of the WAP to identify the WAP where the UE is attached, and an IMEI of the UE for identification of UE by WAP for location determination. This can be defined with an delimitation character in between the two numbers or alternatively each of these values can be provided in two different parameters; e.g., deviceIdentifier=IMEI and wapIdentifier=MAC.

During IMS registration of the UE using the architecture 400 of FIG. 4, the Serving-CSCF 406 stores a value in the HSS 404. In one implementation, the HSS is configured to store this value, which is in actuality is the (AP) MAC address and IMEI combination of the UE. As noted above, the BSSID attribute contains the BSSID of the access point where UE is located in a WLAN. The format used for BSSID is described in IEEE Std 802.11-2012, and includes the following fields:

1) Type (1 byte): This field MUST be set to 0x05.
2) Length (1 byte): This field MUST be set to 0x06.
3) BSSID (6 bytes): This field specifies the MAC address of the AP with which a wireless responder's wireless network interface is associated. It is generated by combining the 24 bit Organization Unique Identifier (the manufacturer's identity) and the manufacturer's assigned 24-bit identifier for the radio chipset in the WAP.

This identifier is fetched by the AAA 402 using SWx interface 425 from the HSS, and provided to the ePDG 311, such as upon a specific request issued from the ePDG 411 (or a proxy entity or process thereof). The ePDG 411 sends this value to the relevant Wi-Fi AP 414 as part of the above-described GET request. The AAA 402 of this implementation includes software/firmware updates in order to perform the above-referenced fetch of the stored identifier from the HSS 404.

As a brief aside, the P-Access-Network-Info (P-ANI) header referenced above represents the access network as perceived by the UE 110, and is communicated to the IMS infrastructure during IMS registration by the UE. See RFC 3455—"Private Header (P-Header) Extensions to the Session Initiation Protocol (SIP) for the 3rd-Generation Partnership Project (3GPP)" The Internet Society (2003), incorporated herein by reference in its entirety, which describes a set of private Session Initiation Protocol (SIP) headers (aka "P-headers") used by the 3rd-Generation Partnership Project (3GPP), including P-Access-Network-Info header syntax requirements. The syntax of the P-Access-Network-Info (P-ANI) header is as follows:

P-Access-Network-Info="P-Access-Network-Info"
  HCOLON access-net-spec
    access-net-spec=access-type*(SEMI access-info)

The P-CSCF 406 (FIG. 4) transparently passes the P-ANI header, if present, in a SIP request or response received from the UE 110 before forwarding the message towards the next hop (e.g., the IMS core) when the pAccessNetworkInfo-Header transparency flag is set to "enable." The P-CSCF can also add the P-ANI header if not present in the request or response, or delete it, depending on configuration.

The IMEI (International Mobile Equipment Identifier) referenced above is a unique number of a prescribed length (e.g., 15 digits) that is assigned to the mobile device at the time of its manufacture. A typical IMEI has the format:
  {TAC (Type Allocation Code—8 digits)+SNR (Serial Number—6 digits)+Spare (e.g., zero—1 digit)}

In contrast, the IMSI (International Mobile Subscriber Identity) is assigned to the mobile user by a telecommunications service provider or carrier (e.g., MNO). This number is typically stored on a SIM (subscriber identity module) card or as part of an electronic SIM (eSIM). The IMSI is also of a prescribed size (15-digits), and takes into account specific country codes, such as to enable use of international subscriber services. Specifically, the IMSI includes (i) a Mobile Country Code (MCC) consisting of 3 digits. The MSS identifies uniquely the country of domicile of mobile subscriber; (ii) a Mobile Network Code (MNC) consisting of 2-3 digits for GSM/UMTS applications. The MNC identifies the home PLMN of the mobile subscriber. The length of the MNC (2 or 3 digits) depends on the value of the MCC; and (iii) a Mobile Subscriber Identification Number (MSIN) identifying the mobile subscriber within a PLMN (10 digits or less).

Yet further, the TMSI (Temporary Mobile Subscriber Identity) is a value assigned by a VLR entity after e.g., a 3GPP or GSM mobile station establishes communication with the GSM network (i.e. base station/BTS). The network then uses TMSI instead of IMSI during call processing and call management tasks; it only has local significance within the network within which it issued, and hence is not distributed more broadly (e.g., to the Home Location Register or the like).

Similarly, the GUTI (Globally Unique Temporary UE Identity) provides an unambiguous identification of the mobile device that does not reveal the device's or the user's permanent identity within the Evolved Packet System (EPS). It further permits identification of the MME (see FIG. 1) and network, and can be used by the network and the mobile device to establish the mobile device's identity, such as during signaling within the EPS. The GUTI includes two main components: (i) GUMMEI—a code that uniquely identifies the MME which has allocated the GUTI; and (ii)—M-TMSI—a code that uniquely identifies the mobile device within the MME that allocated the GUTI.

When a mobile device contacts the relevant network, it transmits the GUTI to the base station, the latter which then uses the GUTI to identify to which MME communications/requests will be sent. Note that if the mobile device has moved from a UMTS cell to an LTE cell, a TAU (tracking area update) procedure is implemented; the mobile device does not have a GUTI, and hence a P-TMSI is sent. The current MME, which controls the area to which the mobile device has moved, can contact the network SGSN (Serving GPRS Support Node, the latter having control of the area where the mobile device was previously located prior to the move), such as to request the subscriber's current profile (e.g., IP address, PDP contexts, etc.).

Conversely, when the mobile device has moved from an LTE to a UMTS cell, the GUTI is used for the P-TMSI as part of the Routing Area Update (RAU) procedure. The P-TMSI (Packet domain TMSI) is an identifier for the UE allocated by the cognizant SGSN. The P-TMSI contains the NRI (Network Resource Identifier) which is used to identify the node from which it was allocated. This identifier is shorter in length as compared to IMSI number described supra, and hence it is more efficient to transmit. One purpose of using a TMSI in place of IMSI is to provide security to the mobile subscriber, as the IMSI need not be transmitted continuously, thereby limiting opportunities for interception and surreptitious use.

The present disclosure, while describing use of the IMEI and MAC address as part of the device identifier used by the IMS system to obtain the UE-specific location data from the WAP 414 in the exemplary embodiments, may alternatively make use of one or more of the other identifiers. For instance, in one such variant, the MAC address and P-TMSI of the UE is used as the basis for the IMS "GET" initiated by the ePDG 411 to the WAP 414 to obtain the location data (the P-TMSI of the UE provided either via the UE directly, or by another entity which issues the P-TMSI to the UE. In another variant, the M-TMSI referenced above is utilized. In yet another variant, the IMSI of the UE is utilized for these purposes.

FIG. 4a is a block diagram illustrating one embodiment of an MSO/MNO network architecture 430, configured with the components of FIG. 4 necessary for location-based service provision within the MSO infrastructure. This architecture also anticipates MNO subscriber roaming to the MSO network, including use of a Wi-Fi enabled UE 110 within both cellular (e.g., LTE) RANs of the MNO, and the WLAN RAN(s) of the MSO, the latter enabling the location-based services in connection with e.g., VoWi-Fi calls.

As shown, the network architecture 420 includes the MNO cores 421-1, 421-*n* and their associated MNO-MSO interfaces (which may include for example interfaces from an MNO core to the MSO core such as eNodeB backhauls, SAS, back office provisioning data interfaces, billing and other OSS systems (BOSS)), which provide data connectivity to the MSO "back end" 320 (e.g., the HFC and backbone portions of the MSO's plant as shown in FIG. 3 herein). As shown, this MSO back end is also in communication with the service domains, specifically the WLAN APs 414 via e.g., a DOCSIS or other service "drop" at the service location(s). Data is communicated from the CBSDss 314 in the MSO CBRS RAN to an MSO/MNVO private management network.

Within the various MNO cores 421 are typical MNO 3GPP/LTE and IMS cellular core, entities/processes, including one or more VPN aggregators (for aggregating user data), serving gateways (SGWs), mobility manager entity (MME), MNO AAA server(s), packet/PDN gateways (PGWs), and home subscriber servers (HSSs) of the type shown in FIG. 4. Specifically, in this embodiment, the MSO core architecture (discussed below) includes many of the components of FIG. 4 (i.e., those needed to effect the location-based services within the MSO WLAN RANs), while each MNO maintains its own IMS architecture for provision of other IMS-based services to its subscribers.

Notably, the IMS components of the MSO private management network are in effect duplicates of those within the respective MNO networks, such that the MSO components such as the AAA server 402 and HSS 404 "mirror" the relevant MNO data (such as via periodic updates) as to MNO subscriber data, etc. However, the MSO IMS components of FIG. 4a also include the aforementioned configuration changes/enhancements necessary to support the WLAN location-based services, including inter alia, the ePDG HTTP(s) server protocol stack (see discussion of FIGS. 8a-9 below), enhanced SLg interface with the GMLC, etc.).

Hence, the architecture 430 of FIG. 4a enables any valid MNO subscriber to utilize the "mirrored" local MSO IMS and WLAN RAN infrastructure to place e.g., a VoWi-Fi call without authentication as an MSO subscriber.

Figure 4B:
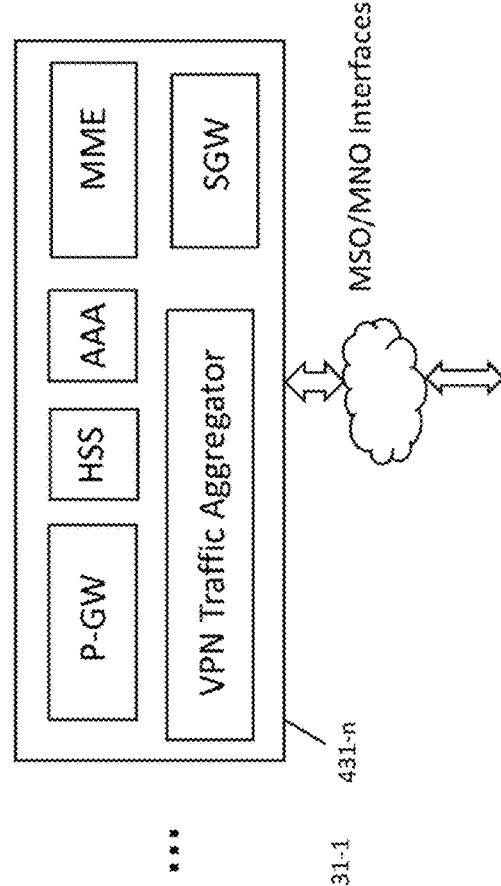
FIG. 4b is a logical block diagram of a second exemplary embodiment of an IMS system supporting location-based services, according to the present disclosure.
Figure 4B:
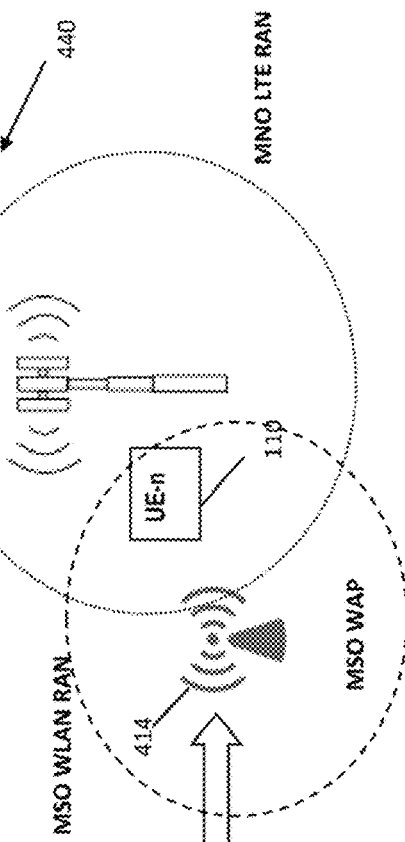
Figure 4B:
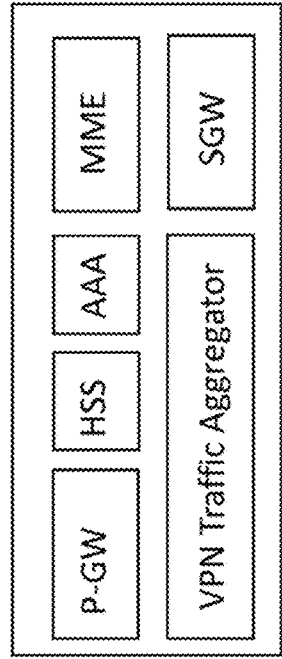
Figure 4B:
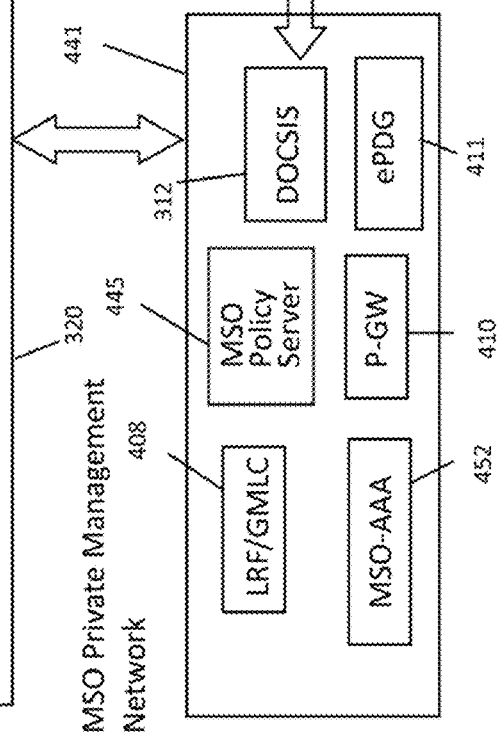

As opposed to the "unmanaged" network of FIG. 4a, the managed service-provider architecture 440 of FIG. 4b advantageously allows, inter alia, optional control and management of a given user's access (such user which may be a network subscriber, or merely an incidental/opportunistic user of the service) via the wireless access point(s) 414, including imposition and/or reconfiguration of various access "rules" or other configurations applied to the wireless access points, while also leveraging a given MNO network IMS infrastructure. For example, the service provider network 440 allows for selective access control, such as where the MSO configures the network 440 to permit unrestricted access to the VoWi-Fi services, including for emergency call (911) or information call (411) purposes, but requires MSO authentication for other services. Under such a configuration, the user's UE would still be required to authenticate to the underlying or connected IMS infrastructure (whether operated in whole or part by an MNO or other entity) via the SIM of the UE before the call could be processed over the IMS portion of the VoWi-Fi network, but no MSO-specific authentication or entitlements check would be required for the 911/411 calls. This capability can advantageously be selectively turned on/off if desired via MSO control. Hence, anyone with a valid subscription to a mobile cellular/data service with IMS capability could place a 911/411 VoWi-Fi call via the MSO infrastructure (e.g., WLAN AP and DOCSIS backhaul and core functions), assuming that their UE WLAN interface can associate with and utilize the relevant AP.

The MSO private management network 431, 441 also includes in some implementations a WAP database (not shown), which in the illustrated embodiment retains data relating to, among other things: (i) WAP 414 identification (e.g., MAC), (ii) WAP location, (iii) association with parent or child nodes or networks (if any), and (iv) WAP configuration and capabilities data. The WAP database may also include MSO-maintained data on WAP associations (e.g., which UEs have associated with it), historical patterns, and other data which enable the MSO to implement location-based service planning and operation within the premises or venue within which the WAP is located.

It will be appreciated that various attributes of the architectures 430, 440 described above can be combined if desired. For instance, the aforementioned MSO policy server 445 and MSO AAA functions 452 can be utilized in conjunction with the "local" IMS components of the architecture 430 of FIG. 4a, such that the WLAN UE placing a VoWi-Fi call via the MSO WLAN RAN must authenticate to the MSO non-IMS infrastructure (i.e., as a valid MSO subscriber) in addition to registering/authenticating within the IMS infrastructure. Various other combinations will be recognized by those of ordinary skill given the present disclosure.

Moreover, as previously noted, service providers such as cable, terrestrial, fiber or satellite MSOs are increasingly providing indoor wireless services (e.g., IEEE 802.11-2016-compliant APs with FTM capability as described above) which may be for instance integrated with other devices provided by the MSO such as modems, gateways or routers, or alternatively purchased as OEM devices (e.g., from an electronics retailer). Accordingly, there is a need and desire to leverage these devices for provision both of MSO-provided location-based services and non-MSO provided location-based services. Users within a premises served by an MSO modem or gateway (e.g., subscribers of the MSO, or merely "incidental" or opportunistic users present within an MSO-served venue) may employ various combinations of equipment, backhaul, and service provider, including e.g.: (i) use MSO-provided Wi-Fi AP(s) and backhaul (e.g., DOCSIS modem through MSO core) for location-based services provided by that MSO (hereinafter "MSO end-to-end location services"); (ii) use OEM-provided Wi-Fi AP(s) and MSO backhaul for location-based services provided by the serving MSO (hereinafter "MSO/OEM location services"); (iii) use MSO-provided Wi-Fi AP(s) and backhaul for location-based services provided by an entity other than the MSO (hereinafter "MSO/third party location services"); or (iv) use OEM-provided Wi-Fi AP(s) and MSO backhaul for location-based services provided by a third party (hereinafter "OEM/MSO/third party location services").

Hence, depending on the use case (or cases) above that are employed in a particular scenario, an MSO or MSO proxy entity may need access to "meter level" location-data for providing services such as location-based delivery of good or services within an MSO-served premises, or provision of location data of a user device for emergency services within that premises, whether the service is provided by the MSO (e.g., targeted content delivery to particular platforms), or otherwise (e.g., emergency responders, pizza deliverers, etc.). Accordingly, the architectures 400, 430, 440 described above may advantageously be adapted to support any of these scenarios, including via a) provision of the pre-configured equipment by the MSO to its subscribers; b) provision of equipment to the subscribers which can be configured thereby, such as via "app" or new firmware download/installation procedures, or c) provision of app or firmware downloads by the MSO or its proxy (e.g., an online store such as Google Play) that can be installed on OEM equipment purchased by the user/subscriber.

Methods—

Figure 5:
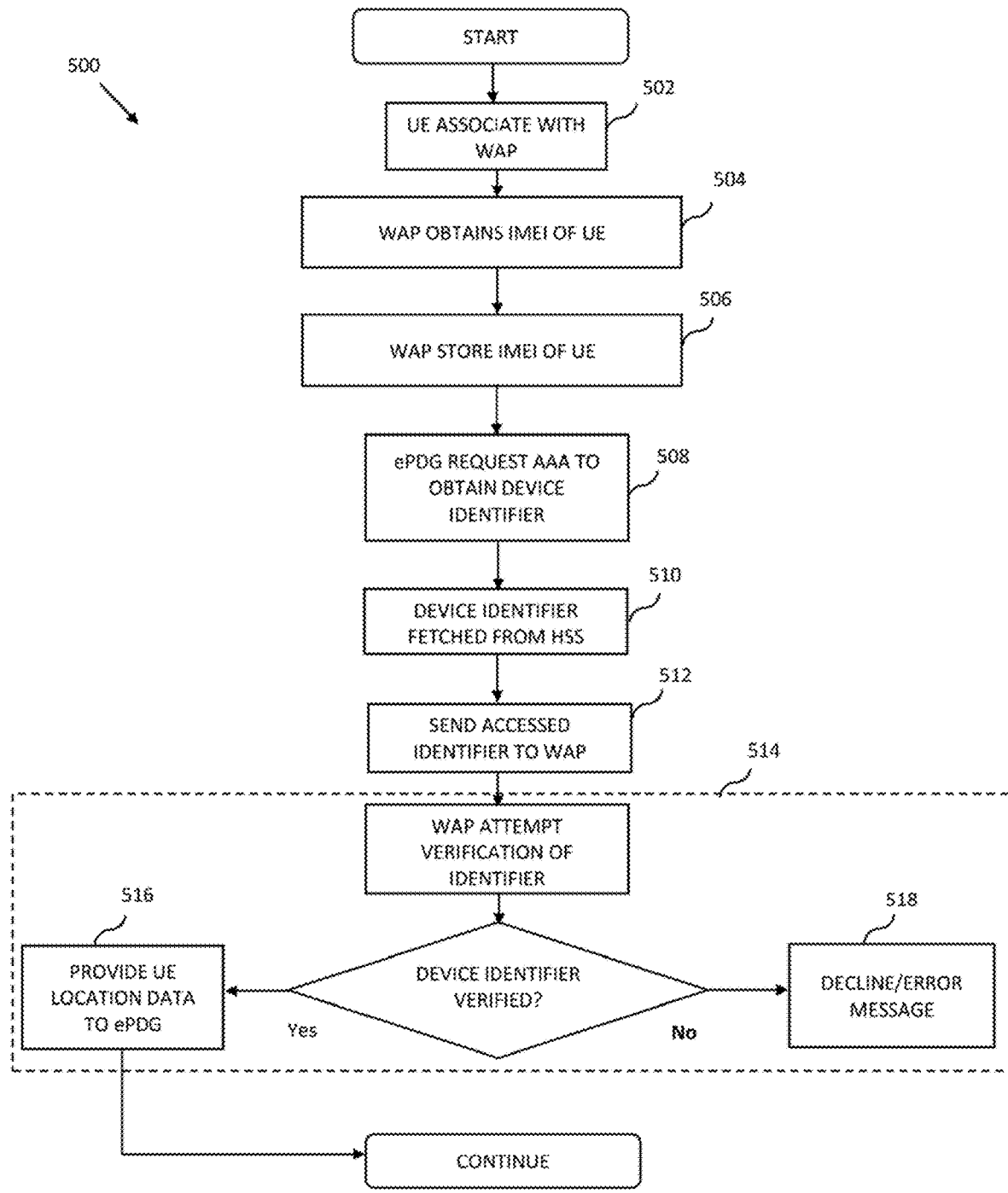
FIG. 5 is logical flow diagram of an exemplary method for enabling location-based service provision according to the present disclosure.
Figure 6:
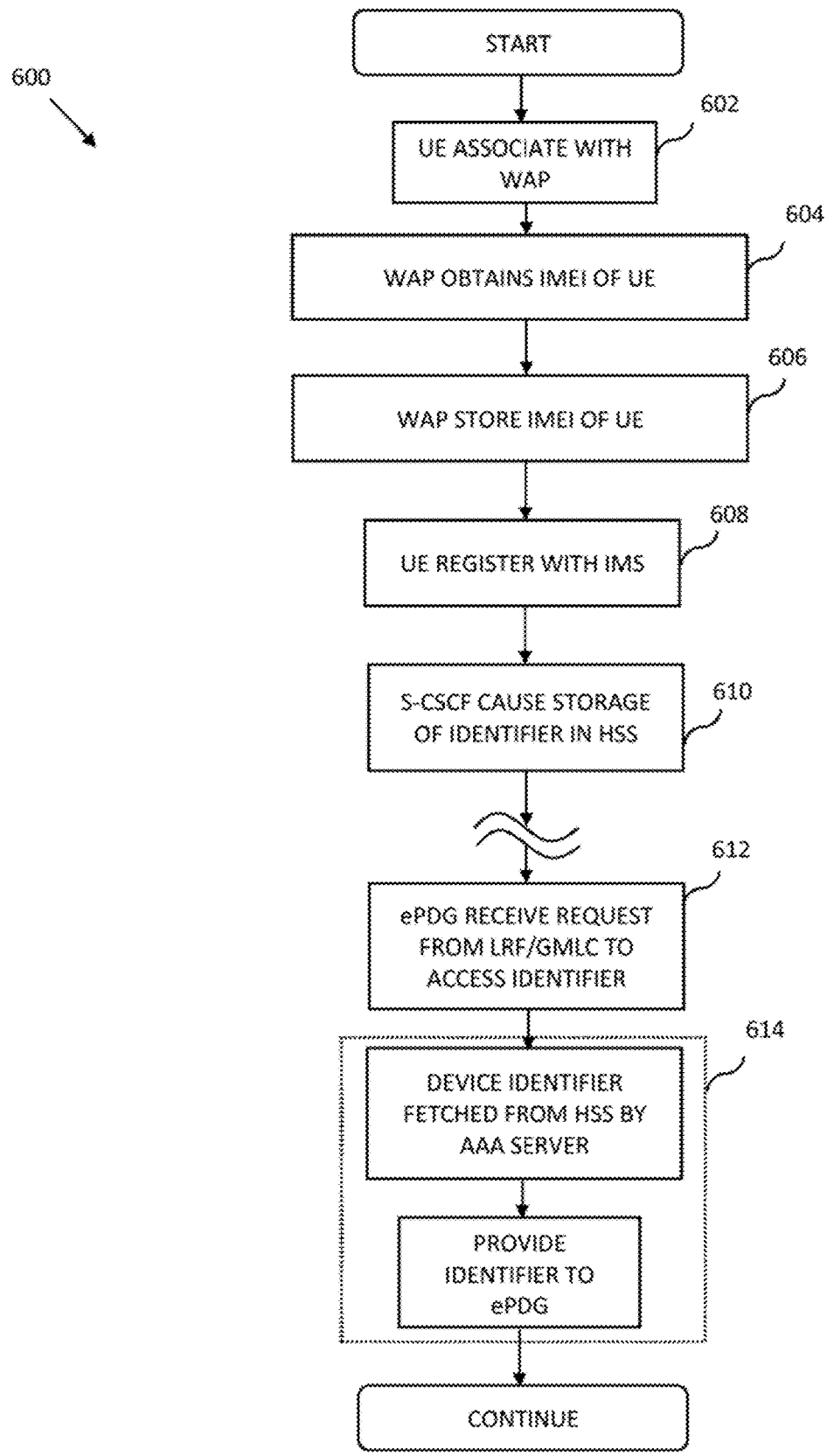
FIG. 6 is logical flow diagram of one exemplary implementation of the method of registering a UE/WAP combination with the IMS infrastructure.

Referring now to FIGS. 5-6, embodiments of the method of obtaining location-related data are shown and described in detail. It will be appreciated that while the exemplary embodiments of the methodology are described in the context of the aforementioned architectures 400, 430, 440 of FIGS. 4-4b (i.e., an IMS-based architecture with WAP, ePDG, CSCF functions, HSS, etc.), the methodology may be readily adapted to other non-IMS data environments and systems by one of ordinary skill when given the present disclosure.

The method 500 of FIG. 5 illustrates the approach used when the UE has previously been registered within the serving IMS (and hence its data is resident within the HSS 404).

At step 502 of the method 500 of FIG. 5, a UE 110 first associates with a given WAP 414 via e.g., normal Wi-Fi association procedures (including for example the AP 414 transmitting beacons, the UE exchanging messaging with the AP to identify itself, etc. as set forth in IEEE 802.11 standards generally). In the exemplary embodiment, the WAP 414 includes the aforementioned FTM capability per 802.11-2016, and hence may also advertise its FTM capability, vertical height, etc. as previously described herein as part of the pre-association or association process.

Per step 504, the WAP 414 obtains the IMEI of the associated UE 110, thereby enabling unique identification of the device.

Per step 506, the WAP stores the received UE IMEI in a local or networked storage location.

At step 510, the device identifier data stored at the HSS 404 (i.e., IMEI+MAC address combination) is fetched by the AAA server 402 using the SWx interface 425. For example in one implementation, the AAA receives an affirmative request from the ePDG 411 (per step 508) to obtain the data, such as pursuant to a request from the LRF/GMLC 408 after a call has been invoked by the UE via the WAP (see example of FIG. 7). This ePDG request may also be generated based on any number of different criteria or use scenarios, including without limitation: (i) a prescribed temporal sampling or update (e.g., the ePDG or LRF/GMLC is programmed to periodically update the UE location every X minutes, and hence calls the AAA server); (ii) a requesting third party process (e.g., a third party end user or application transmitting a request to the IMS which is routed to the ePDG 411 or LRF/GMLC for servicing the request); and/or (iii) in response to a data "push" by e.g., the UE, such as where the UE includes an application operative thereon which contacts the IMS to pull the location-related data for that UE to a receiving process requiring the data.

Once the AAA server has obtained the relevant UE device identifier from the HSS per step 510, the ePDG 411 sends this data to the cognizant Wi-Fi access point 414 with which the UE 110 is associated as part of a GET request transmitted via the HTTP(S) interface 412 (see Table 4 above) per step 512.

Figure 5A:
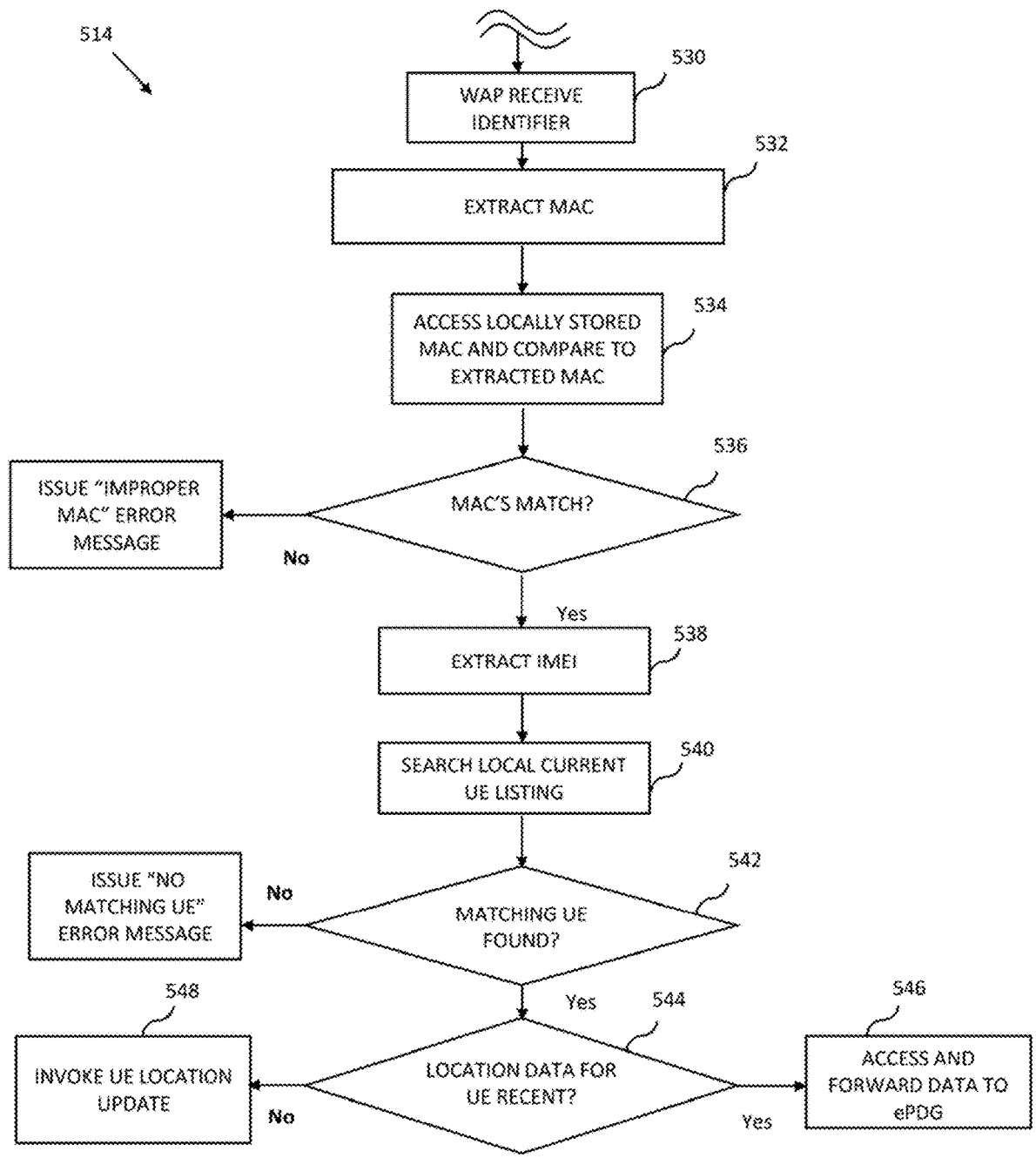
FIG. 5a is logical flow diagram of one exemplary implementation of the method of FIG. 5.

At step 514, the WAP 414 receives the accessed and forwarded device identifier data, and verifies it against the UE IMEI and its MAC address. For instance, in one implementation (see FIG. 5a), the WAP 414 takes the forwarded device identifier (step 530), extracts the MAC (step 532), and verifies it against that stored locally at the WAP (step 534), so as to make sure that the ePDG GET request is directed to that AP (as opposed to another AP in the broader network). Assuming the MAC is verified (step 536), the WAP 414 then extracts the IMEI of the UE from the GET request (step 538), and searches its current listing of associated UEs per step 540 to attempt to identify the relevant UE data. If a matching UE IMEI is found (step 542), then the WAP 414 evaluates whether there is sufficiently recent location-related data (step 544) stored, and if so, the WAP accesses that data per step 546. If not, the WAP invokes a "call" to the (presumably) associated UE 110 to send updated location-related data per step 548.

Based on the outcome of the verification of step 514 by the WAP 414, the ePDG 411 will be either (i) provided with UE location-related data per step 516, or the request will be declined by the AP, and an error/decline message sent to the eDPG (step 518).

The method 500 of FIG. 6 illustrates an exemplary method used when the UE has not previously been registered within the serving IMS (and hence its data is not resident within the HSS). At step 602 of the method 600 of FIG. 6, a UE 110 first associates with a given WAP 414 via e.g., normal Wi-Fi association procedures. In the exemplary embodiment, the WAP 414 includes the aforementioned FTM capability per 802.11-2016, and hence may also advertise its FTM capability, vertical height, etc. as previously described herein as part of the pre-association or association process.

Per step 604, the WAP 414 obtains the IMEI of the associated UE 110, thereby enabling unique identification of the device and AP combination.

Per step 606, the WAP stores the received IMEI associated with the UE in a local or networked storage location.

Registration of the UE with the IMS infrastructure is then performed per step 608, since the UE has previously been "unknown" to the IMS (at least for purposes of VoWi-Fi or similar IMS packet sessions). During IMS registration, the S-CSCF 406 causes storage of the relevant data (including the MAC address and IMEI combination referenced above) in the HSS 404 per step 610. For instance, in one variant, the IMEI can be obtained from the Contact header value of sip.instance parameter. Authentication of the UE can be performed as required; e.g., by using data resident on the UE SIM, pursuant to for example an ePDG directive to authenticate.

Upon receiving a request for the stored data (step 612), the IMEI+MAC address combination is fetched by AAA using the SWx interface from the HSS 404 and provided to the ePDG 411 (step 614) as described above with respect to the embodiment of FIG. 5.

Figure 7:
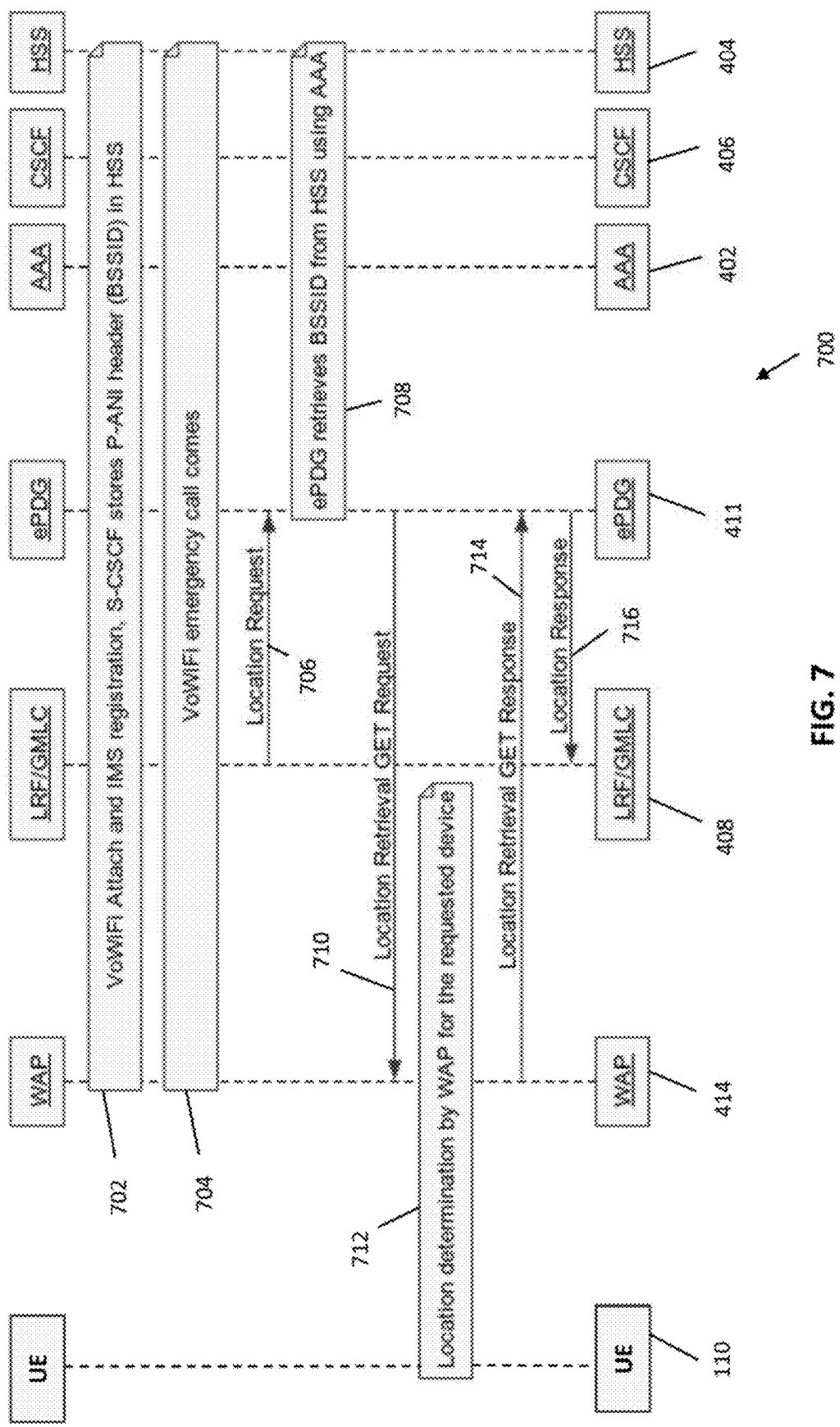
FIG. 7 is a ladder diagram illustrating a first embodiment of a communication flow for providing location data via a VoWi-Fi session within a packet network infrastructure in accordance with the methods of the present disclosure.

Referring now to FIG. 7, an exemplary call flow for UE location data retrieval by GMLC/ePDG from a Wi-Fi access point 414 in the context of an emergency (e.g., 911) VoWi-Fi call, is shown and described. As illustrated, the call flow 700 includes an initial UE association with the WAP, and registration of the UE of the combination identifier in the HSS by the S-CSCF (step 702). It is noted that in the present context, the term "CSCF" may refer to either the one or more CSCF functions/entities generically, or individual sub-entities or sub-functions thereof (e.g., P-CSCF, S-CSCF, etc.).

Next, at step 704, an emergency call is initiated by the UE user and received by the WAP. The LRF/GMLC 408, in response to the call, initiates a location request (step 706) to the ePDG 411, which queries for (and receives) the identifier data per step 708. In one embodiment, the AAA server 402 is used as the ePDG proxy to access the HSS 404 and return the required identifier data, as shown.

Using the retrieved data, the ePDG 411 formats and transmits an HTTPS GET request to the cognizant WAP 414 per step 710. If not already done, the UE location-related data is then obtained by the WAP in response to the GET per step 712, and a GET response including the obtained location data sent from the WAP 414 to the ePDG 411 per step 714. The stack in the ePDG 411 then formats and sends the location response (which may be the entire response, or merely the data formatted into another protocol message) to the LRF/GMLC 408 at step 716.

It will be appreciated that while the foregoing embodiments of the methodology (and supporting architectures) are described with respect to obtaining "location data" for a UE from one or more 802.11-2016 enabled WAPs 414, the present disclosure further contemplates both: (i) obtaining data from the WAP(s) relating to various attributes thereof (as opposed to the UE); and (ii) obtaining "location data" for the UE(s) in various different formats, including e.g., actual location data (i.e., where the UE has pre-processed measured FTM data to derive a location estimate, whether absolute or relative to another location/component such as the WAP 414), or "raw" FTM data obtained by the UE and transmitted to the WAP for further processing by the WAP or another entity, such as to determine location of the UE from the raw data.

For example, as previously discussed, devices can request that an AP share its location data (e.g., in latitude/longitude, or in other formats such as an address) under 802.11-2016

Wi-Fi Location protocols. The protocol enables sharing of such information both pre-association (i.e., before the client device associates with a given AP) and post-association; in this fashion, an AP may have the ability to share its location to clients that are not associated to that AP so as to, inter alia, broaden the potential "coverage" of location-based services. The APs can further share data relating to (a) their vertical "height," such as floor number or a height above a prescribed point with client devices; and (b) a set of AP locations (such as via a "neighbor report"), which ostensibly increases efficiency of the data exchange protocols by obviating multiple exchanges. Hence, the architecture 400, 430, 440 described herein can further be configured to request the aforementioned WAP vertical height, neighbor reports, etc. in lieu of or along with the UE location-related data, such as via an appropriately structured GET request similar to that of Table 4 above (yet specifying the alternate data and using the WAP identifier).

The UE may also be configured to provide "raw" FTM or other location-related data to the WAP, such as via an app or firmware upgrade to the UE WLAN stack if the latter does not support such provision of raw data. For instance, the UE can communicate the raw data as "location" data (i.e., formatted so as to be compatible with the location data protocol described above, yet containing the raw FTM or other data). In this fashion, the aforementioned GET request for the location data will return, instead of location data, the raw data, which can be extracted from the GET response sent by the WAP 414. Alternatively, a separate protocol/message structure can be utilized for the FTM raw data if desired.

Furthermore, the present disclosure contemplates yet other actions which can be taken with respect to the WAP and associated UEs. As previously noted, according to the location protocol: (i) the WAP 414 can cause a client to conduct a set of timing measurements, including with other WAPs; and (ii) the client can request that a WAP share a URL or domain name for additional resources (e.g., mapping) data. Moreover, the Wi-Fi Location protocol permits negotiation between a client device and an AP to schedule timing measurements at pre-arranged times, so as to enable inter alia, more power-efficient positioning of devices. Hence, via the HTTP(S) protocol described herein, the ePDG 411 can for example issue a command to the WAP to invoke these features on-demand.

WAP Apparatus—

Figure 8A:
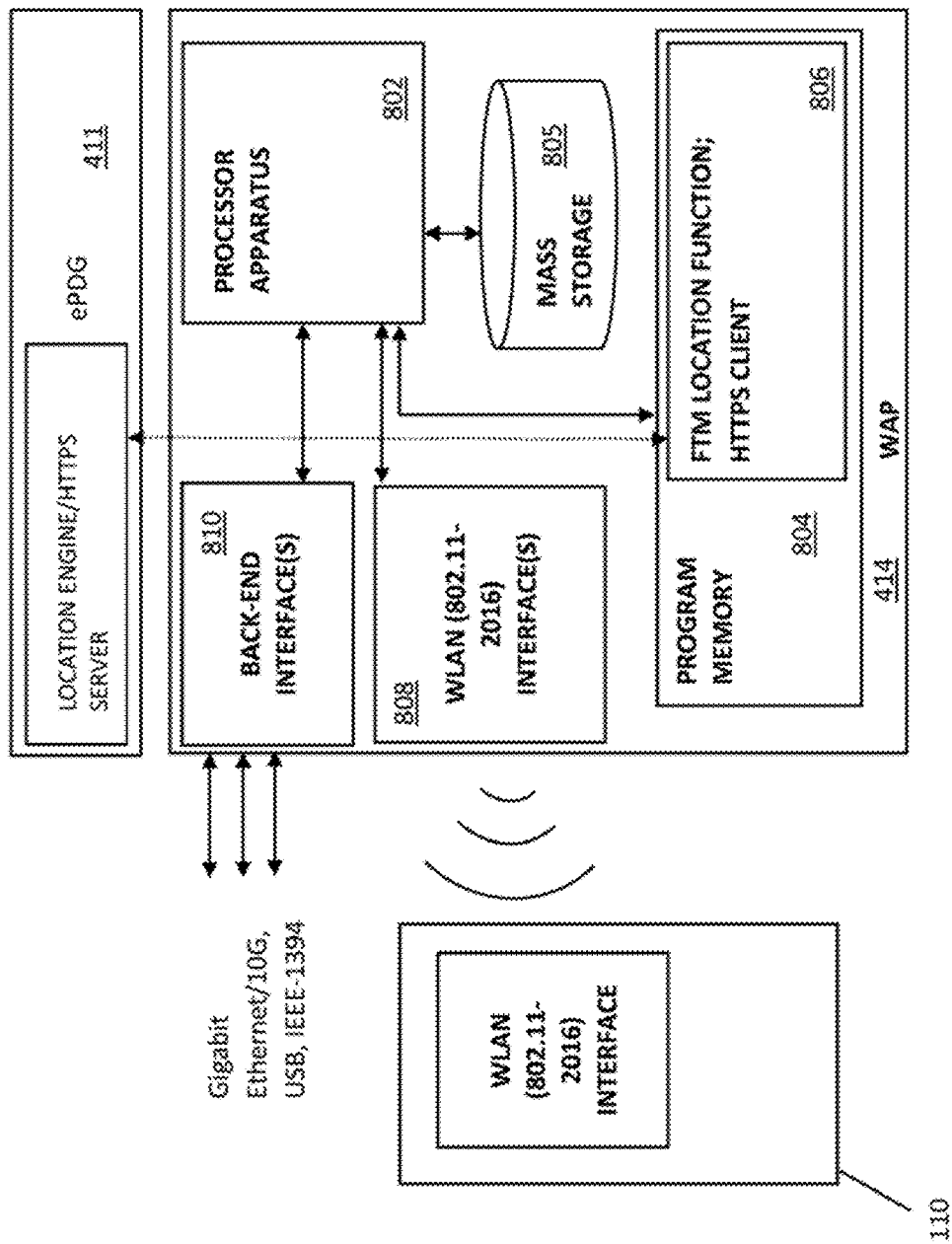
FIG. 8a is a functional block diagram illustrating a first exemplary embodiment of a wireless access point (WAP) apparatus useful with various embodiments of the present disclosure.

FIG. 8a illustrates an exemplary wireless access point (WAP) 414 according to the present disclosure. As shown, the WAP 414 includes, inter alia, a processor apparatus or subsystem 802, a program memory module 804, mass storage 805, an HTTPS client and location function logic 806, one or more WLAN (e.g., 802.11-2016 compliant with Wi-Fi Location/FTM capability) interfaces 808, as well as one or more radio back-end (e.g., backhaul) network interfaces 810.

In the exemplary embodiment, the processor 802 may include one or more of a digital signal processor, microprocessor, field-programmable gate array, or plurality of processing components mounted on one or more substrates. The processor 802 may also comprise an internal cache memory, and is in communication with a memory subsystem 804, which can comprise, e.g., SRAM, flash and/or SDRAM components. The memory subsystem may implement one or more of DMA type hardware, so as to facilitate data accesses as is well known in the art. The memory subsystem of the exemplary embodiment contains computer-executable instructions which are executable by the processor 802.

The WLAN interface 808 is configured to advertise and detect signals from WLAN devices in the premises/venue being served. The antenna(s) of the WAP may include multiple spatially diverse individual elements in e.g., a MIMO- or MISO-type configuration, such that spatial diversity of the received signals can be utilized. Moreover, a phased array or similar arrangement can be used for spatial resolution within the environment, such as based on time delays associated with signals received by respective elements.

The processing apparatus 802 is configured to execute at least one computer program stored in memory 804 (e.g., a non-transitory computer readable storage medium); in the illustrated embodiment, such programs include the HTTPS client and location manager logic 806. Other embodiments may implement such functionality within dedicated hardware, logic, and/or specialized co-processors (not shown). The HTTPS client and location manager 806 is a firmware or software module that, inter alia, communicates with a corresponding HTTPS server portion of the ePDG 411 and/or other upstream or backend entities such as the LRF/GMLC 408 in alternate embodiments.

In some embodiments, the HTTPS client/location manager program 806 utilizes memory 804 or other storage 805 configured to temporarily hold a number of data reports or files before transmission via the backend interface(s) 810 to the ePDG 411. In other embodiments, application program interfaces (APIs) such as those included in an MSO-provided application or those natively available on the WAP (e.g., as part of the computer program noted supra or associated with the HTTPS/location manager 806) may also reside in the internal cache or other memory 804. Such APIs may include common network protocols or programming languages configured to enable communication with the ePDG and other network entities, as well as use procedures for collecting, formatting, compressing and/or parsing information obtained via the WLAN interface(s) 808 such that a receiving device (e.g., ePDG or LRF/GMLC 408) may interpret the reports in order to extract and analyze the relevant location-related information.

Figure 8B:
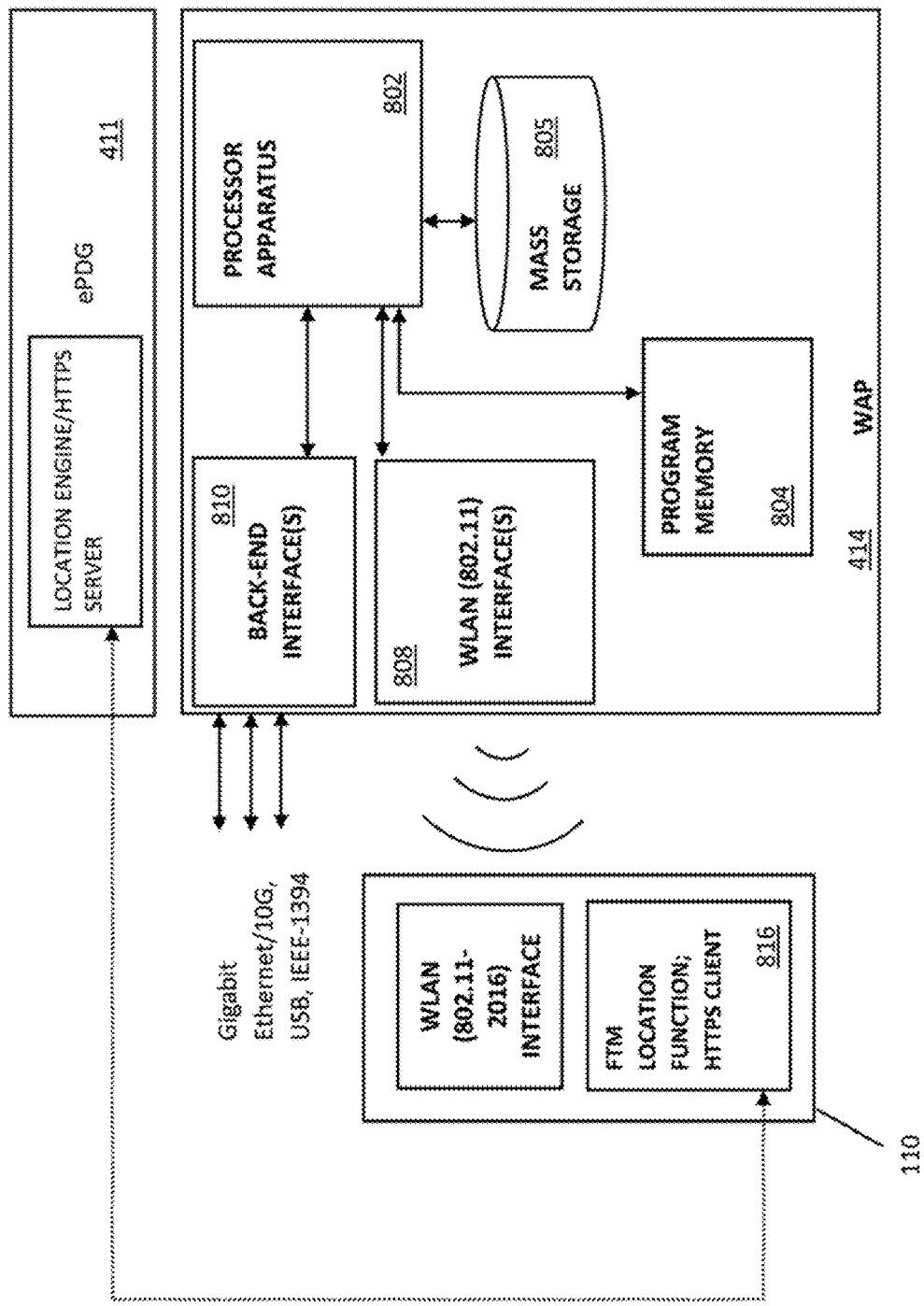
FIG. 8b is a functional block diagram illustrating a second exemplary embodiment of a wireless access point (WAP) apparatus useful with various embodiments of the present disclosure.

FIG. 8b is a functional block diagram illustrating another embodiment of an exemplary WAP 414 according to the disclosure, wherein the WAP acts as a "pass through" entity for HTTPS protocol communications between the ePDG HTTPS "server" and the HTTPS client 816 running on the UE 110. In this embodiment, the UEs 110 may each include an HTTPS client application computer program 816 operative to run on the UE and, inter alia, enable the UE to communicate HTTPS protocol messages directly with the ePDG 411 (versus the WAP as in FIG. 8a). As an aside, downloadable application or "app" may be available to client devices of subscribers of an MSO or cable network (and/or the general public, including MSO "partner" MNO subscribers), where the app allows users to connect to or obtain MSO-provided location-based services while roaming. Application program interfaces (APIs) may be included in an MSO-provided applications, installed with other proprietary software that comes prepackaged with the UE. Alternatively, the relevant MNO may provide its subscribers with the aforementioned functionality (e.g., as a pre-loaded app on the UE at distribution, or later via download), or as a firmware update to the UE stack conducted OTA.

In one implementation, the MSO subscriber or client database may also optionally include the provisioning status of the particular UE that is associated with an MSO subscriber (e.g., whether the UE has an HTTPS/Location manager application installed, status of "pushed" configuration data to the installed app, etc.).

During its operation, the WAP 414 transacts data between its back-end interfaces 810 and the "front-end" WLAN interfaces (i.e., to/from the associated UE) according to Wi-Fi PHY/MAC protocols, with the higher-layer HTTPS datagrams carried by this bearer. However, the WAP 414 includes no HTTPS stack. The HTTPS client logic 816 on the UE is configured to receive the ePDG-issued GET request via the WLAN bearer, and process it to generate the location-related data (if not already generated) via e.g., FTM interactions with the WAP (and possibly others local thereto). To the degree that the UE logic 816 can indigenously perform all FTM measurements and interactions, a "dumb" WAP 414 (i.e., one with reduced capability with respect to that of the embodiment of FIG. 8*a* can be utilized).

ePDG Apparatus—

Figure 9:
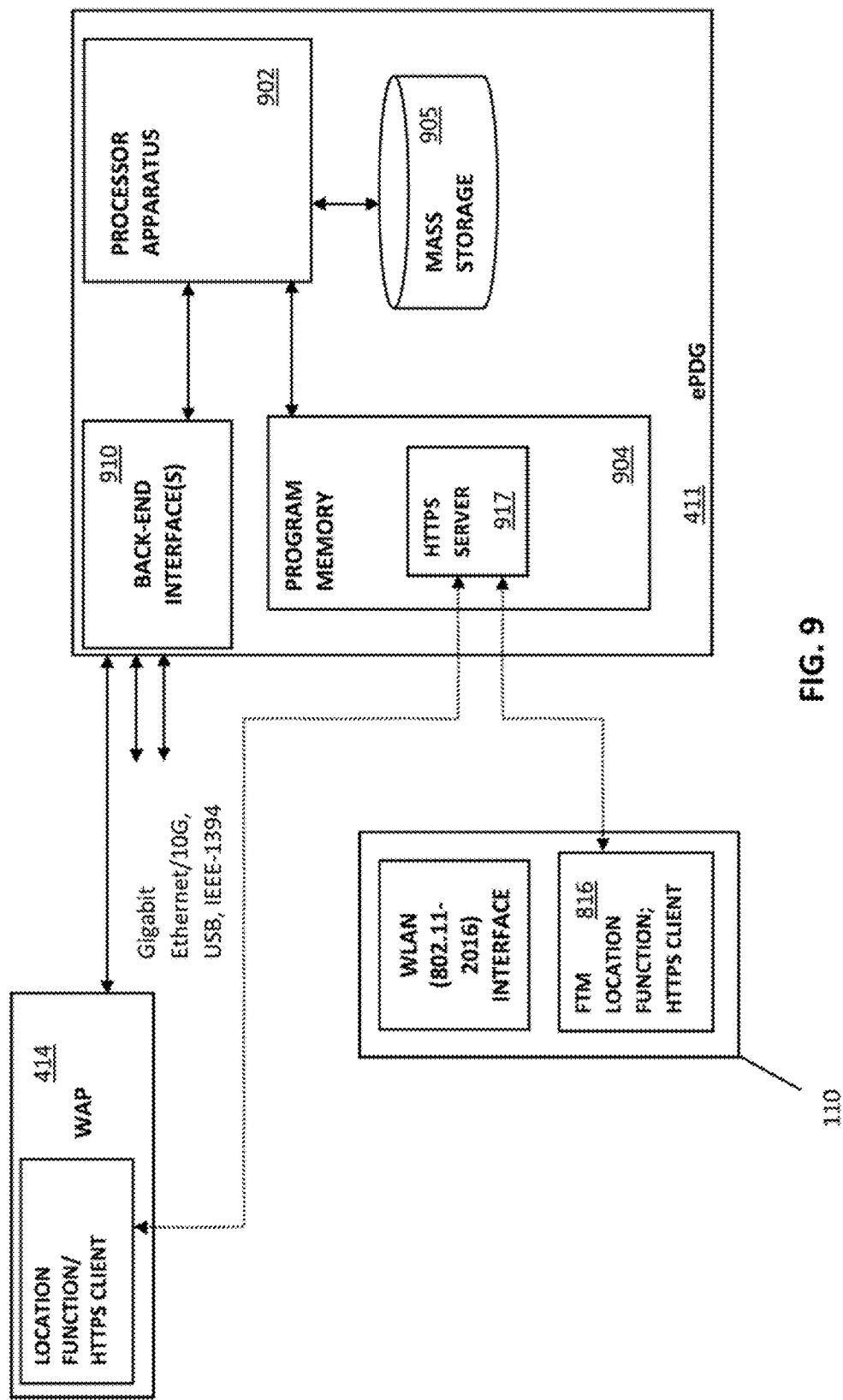
FIG. 9 is a functional block diagram illustrating a first exemplary embodiment of an evolved Packet Data Gateway (ePDG) apparatus useful with various embodiments of the present disclosure.

FIG. 9 illustrates a block diagram of an exemplary embodiment of an ePDG apparatus, e.g., the ePDG of FIGS. 4 and 4*a*, useful for operation in accordance with the present disclosure.

In one exemplary embodiment as shown, the ePDG 411 includes, inter alia, a processor apparatus or subsystem 902, a program memory module 904, an HTTPS server/location manager module 917 (here implemented as software or firmware operative to execute on the processor 902), a back-end network interface 910 for internal MSO communications and control data communication with the relevant WAPs 414, and a communication with the IMS including the AAA server 402 and P-GW 410 as shown win FIG. 4, as well as with the LRF/GMLC 408 via the SLg interface.

In one exemplary embodiment, the ePDGs 411 are maintained by the MSO (see FIG. 4*a*) and are each configured to utilize a non-public IP address within an IMS/Private Management Network "DMZ" of the MSO network. As a brief aside, so-called DMZs (demilitarized zones) within a network are physical or logical sub-networks that separate an internal LAN, WAN, PAN, or other such network from other untrusted networks, usually the Internet. External-facing servers, resources and services are disposed within the DMZ so they are accessible from the Internet, but the rest of the internal MSO infrastructure remains unreachable or partitioned. This provides an additional layer of security to the internal infrastructure, as it restricts the ability of surreptitious entities or processes to directly access internal MSO servers and data via the untrusted network, such as via an ePDG "spoof" or MITM attack whereby an attacker might attempt to hijack one or more ePDGs to obtain UE location data from the corresponding WAPs 414.

In addition, the ePDG 411 of the exemplary implementation is configured to only respond to a restricted set of protocol functions; i.e., authentication challenges from a valid MNO IMS (i.e., those on a "white list" maintained by the MSO), requests for location data from a LRF/GMLC 408, etc.

Although the exemplary ePDG 411 may be used as described within the present disclosure, those of ordinary skill in the related arts will readily appreciate, given the present disclosure, that the controller apparatus may be virtualized and/or distributed within other network or service domain entities (e.g., within the P-GW or LRF/GMLC 408 of the architecture of FIG. 4), and hence the foregoing apparatus 411 of FIG. 9 is purely illustrative.

More particularly, the exemplary apparatus 411 can be physically located near or within the centralized operator network (e.g., MSO network); within or co-located with a P-GW or LRF/GMLC; within an intermediate entity, e.g., within a WAP 414 (e.g., as a "distributed" ePDG dedicated to each WAP; and/or within "cloud" entities or other portions of the infrastructure of which the rest of the wireless network (as discussed supra) is a part, whether owned/ operated by the MSO, MNO or otherwise (see FIGS. 4*a*-4*b*).

In one embodiment, the processor apparatus 902 may include one or more of a digital signal processor, microprocessor, field-programmable gate array, or plurality of processing components mounted on one or more substrates. The processor apparatus 902 may also comprise an internal cache memory. The processing subsystem is in communication with a program memory module or subsystem 904, where the latter may include memory which may comprise, e.g., SRAM, flash and/or SDRAM components. The memory module 904 may implement one or more of direct memory access (DMA) type hardware, so as to facilitate data accesses as is well known in the art. The memory module of the exemplary embodiment contains one or more computer-executable instructions that are executable by the processor apparatus 902. A mass storage device (e.g., HDD or SSD, or even NAND flash or the like) is also provided as shown.

The processor apparatus 902 is configured to execute at least one computer program stored in memory 904 (e.g., the logic of the ePDG including HTTPS server 917 in the form of software or firmware that implements the various functions described herein with respect to location determination and messaging). Other embodiments may implement such functionality within dedicated hardware, logic, and/or specialized co-processors (not shown).

In one embodiment, the ePDG 411 is further configured to register known downstream devices (e.g., access nodes including WLAN APs), other backend devices, and wireless user devices or UEs (remotely located or otherwise), and centrally control the broader wireless network (and any constituent peer-to-peer sub-networks). Such configuration include, e.g., providing network identification (e.g., to APs, client devices such as roaming MNO UEs, and other devices, or to upstream devices), and managing capabilities supported by the wireless network.

The ePDG 411 is further be configured to directly or indirectly communicate with one or more authentication, authorization, and accounting (AAA) servers 402 of the network (see FIG. 4-4*b*), such as via the SWm interface shown in FIG. 4. The AAA servers, whether locally maintained by the MSO or remotely by e.g., an MNO of the subscriber, are configured to provide services for, e.g., authorization and/or control of network subscribers (including roaming MNO "visitors") for controlling access and enforcing policies, auditing usage, and providing the information necessary to bill for services, as well as the device identifier data access of the HSS 404 and provision of data to the ePDG 411 as previously described.

In the exemplary embodiment, one or more backend interfaces 910 are configured to transact one or more network address packets with other MSO networked devices, particularly apparatus such as the MSO-operated WLAN APs 414 within the target premises or venue. Other MSO entities such as the MSO CMTS, Layer 3 switch, network monitoring center, etc. may also be in communication with the ePDG 411 according to a network protocol. Common examples of network routing protocols include for example: Internet Protocol (IP), Internetwork Packet Exchange (IPX), and Open Systems Interconnection (OSI) based network technologies (e.g., Asynchronous Transfer Mode (ATM), Synchronous Optical Networking (SONET), Synchronous Digital Hierarchy (SDH), Frame Relay).

As shown in FIG. 9, the exemplary ePDG 411 is advantageously configured to logically communicate with both the "app-enabled" UEs (such as that shown and described with respect to FIG. 8b herein), as well as the non-app enabled UEs (i.e., OEM devices without any MSO or other app installed to manage location data generation and reporting). Specifically, the HTTPS server 917 on the ePDG 411 can send/receive datagrams addressed to both the HTTPS client 817 of the WAP (if present), and the HTTPS client 816 of the UE (if present), thereby providing heterogeneous configuration support.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method for enabling provision of a wireless location-based service to a user of a computerized mobile device, the computerized method comprising:
   receiving, at a wireless access apparatus of a wireless network infrastructure, data representative of a request for data relating to a location of the computerized mobile device;
   verifying, using at least the wireless access apparatus, each of (i) data uniquely associated to the wireless access apparatus and (ii) data uniquely associated to the computerized mobile device, against respective data previously stored by the wireless access apparatus; and
   based on the verifying, communicating the data relating to the location of the computerized mobile device to an entity of the wireless network infrastructure or a proxy thereof, the communicated data enabling the provision of the wireless location-based service to the user;
   wherein the receiving the data representative of the request comprises receiving, at the wireless access apparatus, at least portions of (i) the data uniquely associated to the wireless access apparatus and (ii) the data uniquely associated to the computerized mobile device, as part of an HTTP (hypertext transfer protocol) GET request message.

2. The computerized method of claim 1, wherein the verifying, using at least the wireless access apparatus, each of (i) the data uniquely associated to the wireless access apparatus and (ii) the data uniquely associated to the computerized mobile device, against the respective data previously stored by the wireless access apparatus, comprises the wireless access apparatus:
   extracting data relating to a MAC (media access control) address of the wireless access apparatus from the HTTP GET request message; and
   verifying the extracted data relating to the MAC address of the wireless access apparatus against data previously stored locally on the wireless access apparatus and relating the MAC address of the wireless access apparatus.

3. The computerized method of claim 2, wherein the verifying, using at least the wireless access apparatus, each of (i) the data uniquely associated to the wireless access apparatus and (ii) the data uniquely associated to the computerized mobile device, against the respective data previously stored by the wireless access apparatus, further comprises the wireless access apparatus:
   extracting data relating to an IMEI (international mobile equipment identifier) of the computerized mobile device from the HTTP GET request message; and
   searching a data structure comprising IMEI data for a plurality of computerized client devices associated with the wireless access apparatus to identify a match between the data relating to the IMEI of the computerized mobile device and the respective IMEI data for one of the plurality of computerized client devices associated with the wireless access apparatus.

4. The computerized method of claim 3, further comprising, based on an identification of the match, evaluating the data relating to the location of the computerized mobile device to determine whether the data relating to the location of the computerized mobile device meets a prescribed criterion for temporal recency.

5. The computerized method of claim 4, wherein the communicating of the data relating to the location of the computerized mobile device to the entity of the wireless network infrastructure or the proxy thereof (i) is further based on the evaluating and (ii) comprises forwarding the data relating to the location of the computerized mobile device as part of an HTTP GET request message, to at least one of an evolved Packet Data Gateway (ePDG) apparatus and/or an LRF/GMLC (Location Retrieval Function/Gateway Mobile Location Center) apparatus.

6. The computerized method of claim 1, further comprising causing establishment of a communications session between the computerized mobile device and the entity of the wireless network infrastructure, the communications session configured to support communication of Internet Protocol (IP) packet data over one or more non-DOCSIS (Data Over Cable Service Interface Specification) quadrature amplitude modulated channels (QAMs) in accordance with a quality of service (QoS) requirement.

7. A computerized method for enabling provision of a wireless location-based service to a user of a computerized mobile device, the computerized method comprising:
   receiving, at a wireless access apparatus of a wireless network infrastructure, data representative of a request for data relating to a location of the computerized mobile device;
   verifying, using at least the wireless access apparatus, each of (i) data uniquely associated to the wireless access apparatus and (ii) data uniquely associated to the computerized mobile device, against respective data previously stored by the wireless access apparatus; and based on the verifying, communicating the data relating to the location of the computerized mobile device to an entity of the wireless network infrastructure or a proxy thereof, the communicated data enabling the provision of the wireless location-based service to the user;

wherein the receiving, at the wireless access apparatus of the wireless network infrastructure, the data representative of the request comprises receiving the data representative of the request at a wireless access apparatus compliant with IEEE (Institute of Electrical and Electronics Engineers) Std. 802.11.

8. The computerized method of claim 7, wherein the communicating of the data relating to the location of the computerized mobile device to the entity of the wireless network infrastructure or the proxy thereof comprises transmitting, via at least one RESTful (Representation State Transfer) interface, wireless link timing measurement data, the wireless link timing data enabling determination of the location of the computerized mobile device.

9. A computerized method for enabling provision of a wireless location-based service to a user of a computerized mobile device, the computerized method comprising:

receiving, at a wireless access apparatus of a wireless network infrastructure, data representative of a request for data relating to a location of the computerized mobile device;

verifying, using at least the wireless access apparatus, each of (i) data uniquely associated to the wireless access apparatus and (ii) data uniquely associated to the computerized mobile device, against respective data previously stored by the wireless access apparatus; and based on the verifying, communicating the data relating to the location of the computerized mobile device to an entity of the wireless network infrastructure or a proxy thereof, the communicated data enabling the provision of the wireless location-based service to the user;

wherein the communicating the data relating to the location of the computerized mobile device to the entity of the wireless network infrastructure or the proxy thereof comprises communicating, via at least a call session control function (CSCF) of the wireless network infrastructure, the data relating to the location of the computerized mobile device to a computerized controller entity of a managed content delivery network.

10. Wireless access point (WAP) apparatus for use in a wireless network infrastructure, the WAP apparatus comprising:

processor apparatus;

network interface apparatus in data communication with the processor apparatus; and storage apparatus in data communication with the processor apparatus, the storage apparatus comprising at least one computer program configured to, when executed on the processor apparatus:

effect an association with the computerized mobile device, the effecting of the association comprising (i) receipt, from a computerized mobile device, of data specific to the computerized mobile device, and (ii) storage of the data specific to the computerized mobile device at a local or network storage location;

receive data representative of a request for a location of the computerized mobile device;

based at least on the request, obtain location-related data from the computerized mobile device;

based at least on the location-related data, determine a location of the computerized mobile device; and provide data indicative of the determined location to an entity of the wireless network infrastructure, the data indicative of the determined location useful to enable provision of a location-based service to the computerized mobile device at the determined location.

11. The WAP apparatus of claim 10, wherein the at least one computer program is further configured to, when executed on the processor apparatus:

receive device identifier data from the entity of the wireless network infrastructure or a proxy thereof; and verify the device identifier data against the data specific to the computerized mobile device stored at the local or network storage location to enable identification of relevant device data.

12. The WAP apparatus of claim 10, wherein the data representative of the request comprises data indicative of a MAC (media access control) address of the WAP apparatus, and the at least one computer program is further configured to, when executed on the processor apparatus:

verify the received data indicative of the MAC address of the WAP apparatus against that data relating the MAC address of the WAP apparatus stored locally at the WAP apparatus, so as to ensure that the request is directed to the WAP apparatus.

13. The WAP apparatus of claim 10, wherein:

the effecting of the association with the computerized mobile device comprises registration of the computerized mobile device with the wireless network infrastructure; and the storage of the data specific to the computerized mobile device at the local or network storage location comprises storage of the data specific to the computerized mobile device within a home subscriber server (HSS) of the wireless network infrastructure.

14. The WAP apparatus of claim 13, wherein the storage of the data specific to the computerized mobile device within the HSS of the wireless network infrastructure comprises storage of a derived value.

15. The WAP apparatus of claim 14, the storage of the derived value comprising storage, as the derived value, at least a portion of each of: (i) the MAC (media access control) address of the WAP apparatus with which the computerized mobile device is associated, and (ii) the IMEI (international mobile equipment identifier) of the computerized mobile device.

16. Computer readable apparatus comprising a non-transitory storage medium, the non-transitory storage medium comprising at least one computer program having a plurality of instructions, the plurality of instructions configured to, when executed on a processing apparatus:

access at least one wireless access apparatus of a wireless network infrastructure, the access comprising access of location-related data for one or more computerized mobile devices; and provide the location-related data to a computerized controller apparatus of the wireless network infrastructure, the provided location-related data configured to enable provision of a location-based service to the one or more computerized mobile devices;

wherein the wireless access apparatus comprises one or more small cells or femtocells each comprising a 3GPP-compliant air interface capable of operation at least within a CBRS (Citizens Broadband Radio System) spectrum.

17. The computer readable apparatus of claim 16, wherein the computer readable apparatus comprises a distributed application, at least a portion of the distributed application operative to execute on at least the computerized controller apparatus, and at least a portion of the distributed application operative to execute on the at least one wireless access apparatus.

18. The computer readable apparatus of claim 16, wherein:
    the computerized controller apparatus comprises a first and second component of the wireless network infrastructure;
    the first component comprises a 3GPP ePDG (evolved Packet Data Gateway) configured to transmit, via a 3GPP-compliant interface, the location-related data to the second component of the wireless network infrastructure; and
    the second component comprises an LRF/GMLC (Location Retrieval Function/Gateway Mobile Location Center) apparatus configured to transmit data representative of a request for the location-related data to the 3GPP ePDG based on initiation of a one or more respective VoWi-Fi (voice over (EPC-integrated) Wi-Fi) calls by the one or more computerized mobile devices.

19. The computer readable apparatus of claim 16, wherein the access comprises:
    transmission, to the at least one wireless access apparatus, of an HTTP (hypertext transfer protocol) GET request message for the location-related data, the HTTP GET request message configured to cause the one or more computerized mobile devices to pre-process fine timing measurement (FTM) data to determine one or more respective location estimates therefor; and
    receipt of an HTTP GET response message from the at least one wireless access apparatus, the HTTP GET response message comprising data indicative of the one or more respective location estimates.

20. The computer readable apparatus of claim 16, wherein the access comprises one or more HTTP (hypertext transfer protocol) protocol communications between (i) the computerized controller apparatus and the at least one wireless access apparatus, and (ii) the at least one wireless access apparatus and the one or more computerized mobile devices, the one or more HTTP protocol communications configured to enable the one or more computerized mobile devices to communicate the location-related data directly to the computerized controller apparatus.

\* \* \* \* \*